United States Patent
Furiya et al.

(10) Patent No.: US 10,446,316 B2
(45) Date of Patent: Oct. 15, 2019

(54) COIL DEVICE AND INDUCTANCE-CHANGING MECHANISM

(71) Applicant: IHI CORPORATION, Tokyo (JP)

(72) Inventors: Kentarou Furiya, Tokyo (JP); Susumu Tokura, Tokyo (JP); Masakazu Hara, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 237 days.

(21) Appl. No.: 15/387,842

(22) Filed: Dec. 22, 2016

(65) Prior Publication Data

US 2017/0103850 A1 Apr. 13, 2017

Related U.S. Application Data

(63) Continuation of application No. PCT/JP2015/068251, filed on Jun. 24, 2015.

(30) Foreign Application Priority Data

Jun. 25, 2014 (JP) .................................. 2014-130242
Dec. 26, 2014 (JP) .................................. 2014-265498

(51) Int. Cl.
| | |
|---|---|
| *H01F 38/14* | (2006.01) |
| *H01F 21/02* | (2006.01) |
| *H01F 21/10* | (2006.01) |
| *H01F 27/36* | (2006.01) |
| *H01F 29/12* | (2006.01) |

(Continued)

(52) U.S. Cl.
CPC .............. *H01F 38/14* (2013.01); *B60L 53/12* (2019.02); *H01F 21/02* (2013.01); *H01F 21/10* (2013.01); *H01F 27/362* (2013.01); *H01F 29/12* (2013.01); *H02J 50/12* (2016.02)

(58) Field of Classification Search
CPC .. H01F 21/10; H01F 29/12; H01F 27/36–367; H01F 2027/348; H01F 38/14; B60L 11/182
See application file for complete search history.

(56) References Cited

U.S. PATENT DOCUMENTS

| 4,068,292 A | 1/1978 | Berry et al. | |
| 8,323,768 B2 * | 12/2012 | Connelly | ............. G01R 33/285 174/392 |

(Continued)

FOREIGN PATENT DOCUMENTS

| CN | 102656648 A | 9/2012 |
| CN | 102684319 A | 9/2012 |

(Continued)

OTHER PUBLICATIONS

International Search Report, PCT/JP2015/068251, dated Sep. 8, 2015, 2 pgs.

*Primary Examiner* — Rexford N Barnie
*Assistant Examiner* — David A Shiao
(74) *Attorney, Agent, or Firm* — Volpe and Koenig, P.C.

(57) ABSTRACT

A coil device includes a first coil portion which faces a second coil portion of another coil device and has a conductive wire, and at least one non-magnetic member disposed on an opposite side from a side facing the second coil portion. The non-magnetic member includes an eddy current interrupter for changing a state of an eddy current formed in the non-magnetic member by interrupting a portion of the eddy current.

8 Claims, 20 Drawing Sheets

(51) Int. Cl.
*B60L 53/12* (2019.01)
*H02J 50/12* (2016.01)

(56) References Cited

U.S. PATENT DOCUMENTS

| | | | |
|---|---|---|---|
| 2009/0121677 A1 | 5/2009 | Inoue et al. | |
| 2010/0320843 A1 | 12/2010 | Kitamura et al. | |
| 2012/0218068 A1 | 8/2012 | Yamakawa et al. | |
| 2012/0229140 A1 | 9/2012 | Shimokawa | |
| 2012/0242447 A1 | 9/2012 | Ichikawa | |
| 2012/0326520 A1 | 12/2012 | Konya | |
| 2013/0038135 A1 | 2/2013 | Ichikawa | |
| 2013/0181535 A1* | 7/2013 | Muratov | H01F 38/14 307/104 |
| 2014/0008974 A1 | 1/2014 | Miyamoto | |
| 2014/0084697 A1 | 3/2014 | Yasuda et al. | |
| 2015/0244181 A1 | 8/2015 | Kagami et al. | |
| 2015/0302984 A1* | 10/2015 | Kurs | H01F 38/14 307/104 |
| 2016/0028244 A1 | 1/2016 | Ichikawa | |

FOREIGN PATENT DOCUMENTS

| | | |
|---|---|---|
| CN | 102738908 A | 10/2012 |
| CN | 102857262 A | 1/2013 |
| JP | 35-21062 Y1 | 8/1960 |
| JP | 62-76516 U | 5/1987 |
| JP | 5-095022 U | 12/1993 |
| JP | 7-106136 A | 4/1995 |
| JP | 7-272937 A | 10/1995 |
| JP | 11-144963 A | 5/1999 |
| JP | 2009-010190 A | 1/2009 |
| JP | 2009-200174 A | 9/2009 |
| JP | 2010-148210 A | 7/2010 |
| JP | 2011-135754 A | 7/2011 |
| JP | 2012-079454 A | 4/2012 |
| JP | 2012-084893 A | 4/2012 |
| JP | 2012-134374 A | 7/2012 |
| JP | 2012-178529 A | 9/2012 |
| JP | 2013-055229 A | 3/2013 |
| JP | 2013-120855 A | 6/2013 |
| JP | 2013-175673 A | 9/2013 |
| JP | 2013-201297 A | 10/2013 |
| JP | 2014-017927 A | 1/2014 |
| WO | 2011/070637 A1 | 6/2011 |
| WO | 2014/069581 A1 | 5/2014 |

* cited by examiner

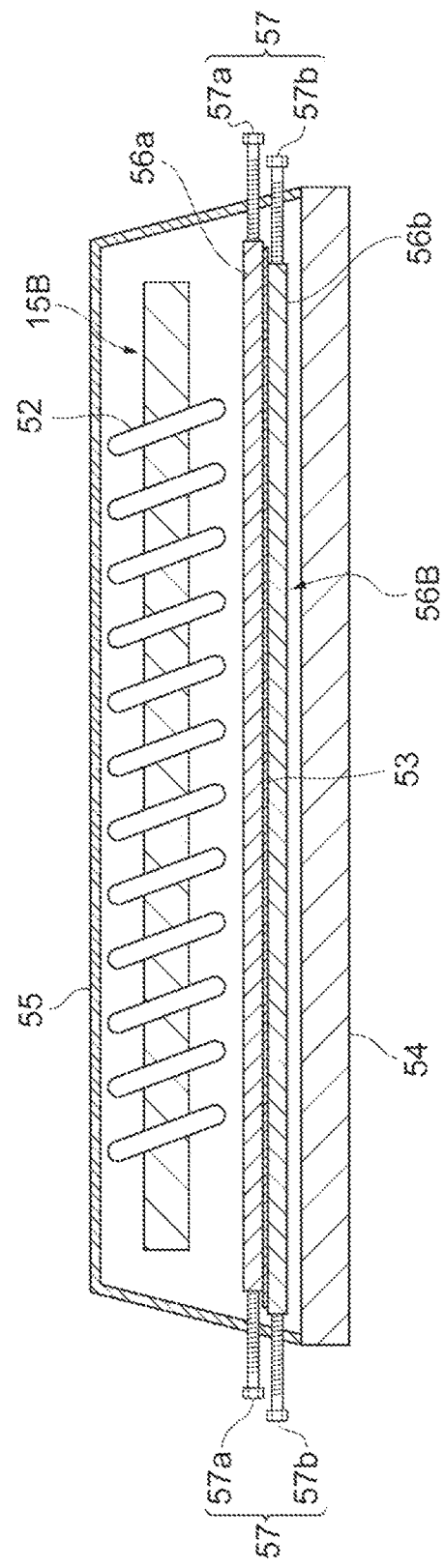

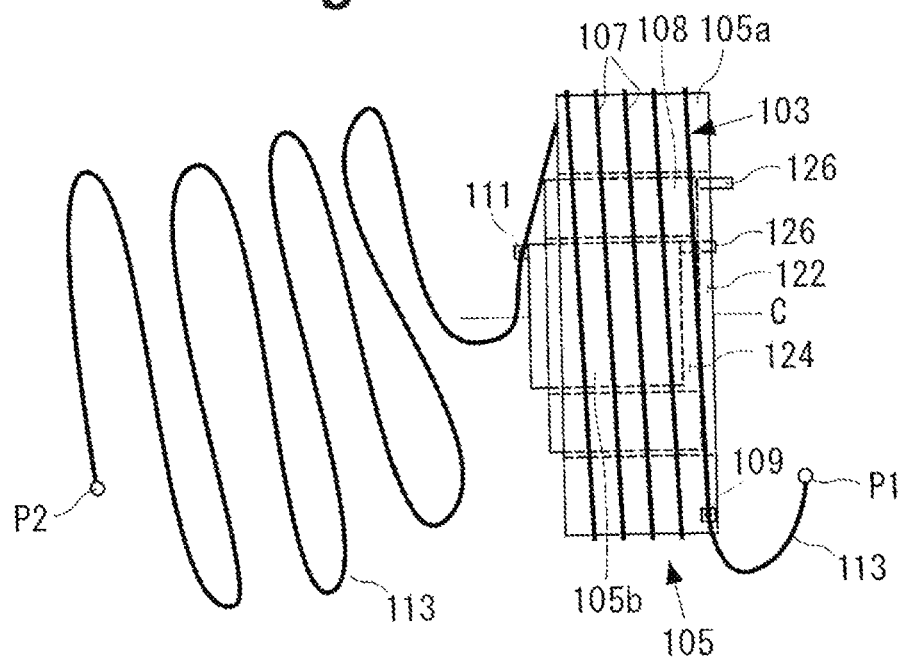
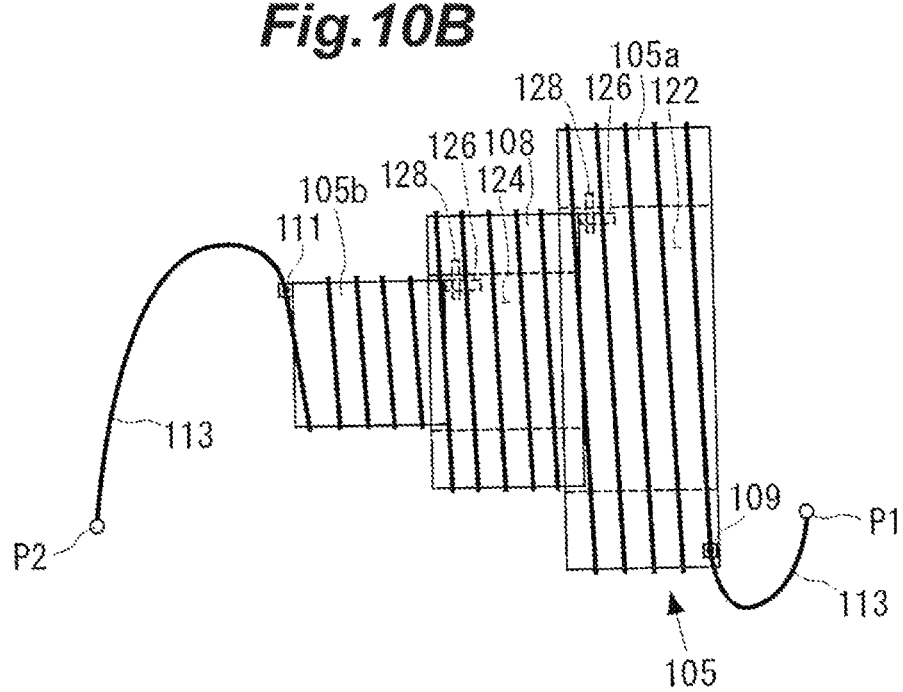

COIL DEVICE AND INDUCTANCE-CHANGING MECHANISM

CROSS-REFERENCE TO RELATED APPLICATIONS

This application is a continuation application of International Application No. PCT/JP2015/068251, filed Jun. 24, 2015, which claims priority to Japanese Patent Application No. 2014-130242, filed on Jun. 25, 2014 and Japanese Patent Application No. 2014-265498, filed on Dec. 26, 2014. The contents of these applications are incorporated herein by reference in their entirety.

TECHNICAL FIELD

The present disclosure relates to a coil device. The present disclosure relates to an inductance-changing mechanism for changing an inductance of a coil inside an electric circuit.

BACKGROUND ART

A wireless power transfer system includes a power transmission coil device corresponding to a part of a power transmitter and a power reception coil device corresponding to a part of a power receiver, and implements wireless power transmission using magnetic coupling between coils such as an electromagnetic induction scheme, a magnetic resonance scheme, etc. For example, the wireless power transfer system is applied to a power feeding system of an electric vehicle or a plug-in hybrid vehicle. In this case, the power reception coil device is installed in the vehicle.

Power transmitted between the coil devices changes depending on an inductance of a coil portion. For this reason, an optimum inductance value is determined for each system in terms of transmitted power. However, there is concern that an inductance may change due to a variation of a usage environment such as a temperature, a humidity, etc. or a variation during production. A technology for compensating for the change has been proposed (e.g., see Patent Literature 1). Patent Literature 1 discloses that an inductance is changed by moving a magnetic-field shield such that a positional relationship between a coil and the magnetic-field shield is changed in a power transmitter which includes the coil and the magnetic-field shield corresponding to a magnetic body. Patent Literature 2 discloses that an inductance is changed depending on a distance between a coil and a shield.

Examples of an electric circuit having a coil include a wireless power transfer circuit and a wireless power reception circuit. For example, the wireless power transfer circuit and the wireless power reception circuit are described in Patent Literature 3 below. As in Patent Literature 3, the wireless power transfer circuit includes a power feeding coil for feeding power, and the wireless power reception circuit includes a power reception coil for receiving power wirelessly from the power feeding coil using electromagnetic induction. The wireless power reception circuit supplies the power received by the power reception coil to a battery or a load.

For example, the wireless power transfer circuit and the wireless power reception circuit are provided in an apparatus for feeding power to a vehicle and in the vehicle, respectively. That is, power is fed from the power feeding coil of the wireless power transfer circuit to a battery of the vehicle through the power reception coil of the wireless power reception circuit provided in the vehicle.

CITATION LIST

Patent Literature

Patent Literature 1: WO 2011/070637 A
Patent Literature 2: Japanese Unexamined Patent Publication No. 2011-135754
Patent Literature 3: Japanese Unexamined Patent Publication No. 2010-148210
Patent Literature 4: Japanese Unexamined Patent Publication No. 2014-17927
Patent Literature 5: Japanese Unexamined Patent Publication No. 2012-079454

SUMMARY

Technical Problem

The present disclosure describes a coil device and an inductance-changing mechanism capable of achieving a desired inductance.

Solution to Problem

One aspect of the disclosure is a coil device facing another coil device to transmit or receive power wirelessly, the coil device including a first coil portion facing a second coil portion of the other coil device and including a conductive wire, and at least one non-magnetic member disposed on an opposite side from a side facing the second coil portion, wherein the non-magnetic member includes an eddy current interrupter for changing a state of an eddy current formed in the non-magnetic member by interrupting a portion of the eddy current.

In addition, one aspect of the disclosure is an inductance-changing mechanism for changing an inductance of a coil inside an electric circuit, the inductance-changing mechanism including a coil support body for supporting the coil, wherein the coil is formed by a conductive wire wound around the coil support body, the coil support body includes first and second fixing portions to which both end portions of the coil are fixed, mutual relative positions of the first and second fixing portions being changeable, or a plurality of types of fixing portions for fixing the conductive wire, and a shape of the coil is changeable due to relative positions of the first and second fixing portions being changeable, or a state being switchable between one state in which the conductive wire is fixed by any one of the plurality of types of fixing portions and another state in which the conductive wire is fixed by another fixing portion.

Effects

According to some embodiments of the disclosure, a desired inductance may be achieved.

BRIEF DESCRIPTION OF DRAWINGS

FIG. 5 is a cross-sectional view illustrating a coil device according to a fourth embodiment.

FIGS. 10A and 10B illustrate an example of a case in which a coil is not a conductive coil spring in Configuration Example 1.

DESCRIPTION OF EMBODIMENTS

Figure 1:
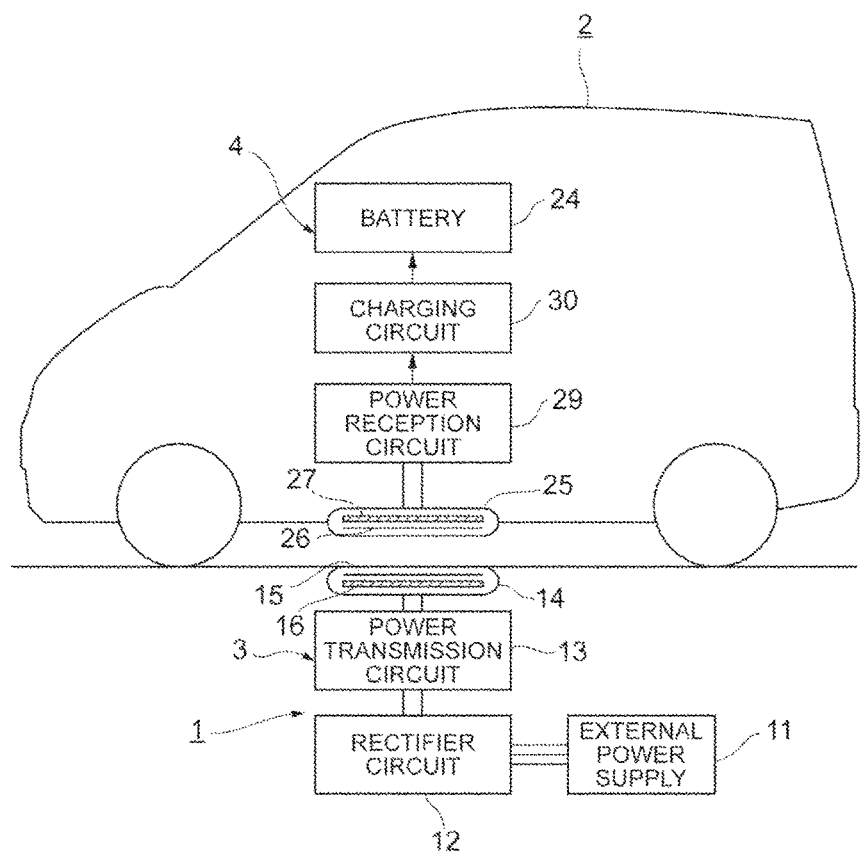
FIG. 1 is a block diagram illustrating a configuration of a main part of a wireless power transfer system to which a coil device of a first embodiment of the disclosure is applied.

According to the above-described coil device, when an eddy current interrupter is provided in a non-magnetic member, a portion of an eddy current generated in the non-magnetic member is interrupted, and flows to bypass the eddy current interrupter. In this way, a distance for which the eddy current flows becomes longer, a magnetic reluctance increases, and the eddy current becomes smaller. In this way, eddy current-dependent magnetic fluxes that cancel out magnetic fluxes generated by a first coil portion are reduced, and an inductance increases. In this way, even when the non-magnetic member is moved closer to the first coil (that is, a conductive wire), a desired inductance is achieved by appropriately adjusting a decrease in inductance due to the non-magnetic member moved closer to the first coil and an increase in inductance due to the eddy current interrupter. An increase in size of the device is suppressed using the increase in inductance due to the eddy current interrupter.

In some aspects, the eddy current interrupter is a hole portion provided in the non-magnetic member to penetrate through the non-magnetic member in a direction of facing a second coil portion, or a depressed portion recessed in the facing direction. When the hole portion or the depressed portion serving as the eddy current interrupter is provided, a portion of an eddy current may be reliably and easily interrupted and a path of the eddy current may be changed in the non-magnetic member.

In some aspects, the coil device further includes a moving mechanism for moving the non-magnetic member in a direction orthogonal to the direction of facing the second coil portion. Since the eddy current interrupter is provided in the non-magnetic member, when the non-magnetic member is moved in the direction by the moving mechanism, a positional relationship between a conductive wire of the first coil portion and the eddy current interrupter is changed, and a path of an eddy current is changed. Therefore, an inductance may be adjusted to a desired inductance by moving the non-magnetic member.

In some aspects, the coil device further includes a movement control mechanism for adjusting a distance for which the non-magnetic member is moved by the moving mechanism by controlling the moving mechanism. In this case, it is possible to actively control the moving distance of the non-magnetic member.

In some aspects, the at least one non-magnetic members is a plurality, and the plurality of non-magnetic members includes a first non-magnetic member and a second non-magnetic member disposed adjacent to the first non-magnetic member on a side farther from the second coil portion than from the first non-magnetic member. In this case, when positions of the first non-magnetic member and the second non-magnetic member are separately adjusted, an overlapping state of the eddy current interrupter may be changed. In this way, a path of an eddy current is changed. It is possible to widen an adjustment range of an inductance as a whole non-magnetic member when compared to a case in which one non-magnetic member is provided.

In some aspects, each of the first non-magnetic member and the second non-magnetic member includes a hole portion corresponding to the eddy current interrupter, and a first hole portion of the first non-magnetic member and a second hole portion of the second non-magnetic member are formed in similar patterns. When the first hole portion and the second hole portion are formed in similar patterns, an overlapping state of the hole portion may be easily adjusted by moving one of the first non-magnetic member and the second non-magnetic member. Thus, it is easy to adjust an inductance as a whole non-magnetic member.

In some aspects, each of the first non-magnetic member and the second non-magnetic member includes a hole portion corresponding to the eddy current interrupter, and a first hole portion of the first non-magnetic member and a second hole portion of the second non-magnetic member may be formed in different patterns.

In some aspects, the first non-magnetic member includes a hole portion corresponding to the eddy current interrupter, and the second non-magnetic member does not include the eddy current interrupter. In this case, magnetic field emission may be reduced.

In some aspects, the coil device further includes a conductive sheet-shaped member provided between the first non-magnetic member and the second non-magnetic member, and capable of being in close contact with the first non-magnetic member and the second non-magnetic member. When the sheet-shaped member capable of being in close contact with an uneven shape of the first non-magnetic member and the second non-magnetic member is provided, an electrical contact between the first non-magnetic member and the second non-magnetic member may be ensured.

In some aspects, the eddy current interrupter is a long hole portion or a groove portion extending in the direction orthogonal to the direction of facing the second coil portion, and the long hole portion or the groove portion extends in a direction intersecting with an extending direction of the conductive wire in the first coil portion. An eddy current is prone to flow along the conductive wire (in the opposite direction to a direction of a current flowing through the conductive wire). Therefore, according to the long hole portion or the groove portion extending in a direction intersecting with the flow, an alternative route of the eddy current may be maximized. That is, a variation width of an inductance may be maximized.

In some aspects, the long hole portion or the groove portion protrudes outward from the first coil portion in the orthogonal direction. In this case, a larger amount of eddy current is interrupted, and an alternative route of the eddy current increases. Therefore, an inductance may be easily increased.

In addition, for example, one configuration example of an inductance-changing mechanism corresponding to one aspect of the disclosure is configured as below.

The coil support body has one end portion and the other end portion in a winding axis direction of the conductive wire. The one end portion includes the first fixing portion to which a portion of the conductive wire corresponding to one end portion of the coil is fixed, and the other end portion includes the second fixing portion to which a portion of the conductive wire corresponding to the other end portion of the coil is fixed. The coil support body is extensible and contractible in the winding axis direction, thereby changing relative positions of the first and second fixing portions to change the shape of the coil.

In this way, when the one end portion and the other end portion of the coil are fixed to the one end portion and the other end portion of the coil support body in the winding axis direction (first and second fixing portions), the shape of the coil may be changed by extending or contracting the coil support body. In this way, an inductance value of the coil may be changed.

In another configuration example, the coil support body includes a first coil support body having the first fixing portion and a second coil support portion having the second fixing portion, the coil is a conductive coil spring, the second coil support portion extends in the winding axis direction from an end surface of the first coil support portion in the winding axis direction, and the relative positions of the first and second fixing portions are changed to change the shape of the coil, due to an amount of extension being changeable, and the inductance-changing mechanism further includes a maintenance mechanism for maintaining a changed amount of extension by resisting an elastic restoring force of the coil spring.

In this way, the shape of the coil may be changed by changing the amount of extension of the conductive coil spring and maintaining the changed amount of extension using the maintenance mechanism. In this way, an inductance value of the coil may be changed.

In another configuration example, the coil support body includes first and second coil support portions, the first and second coil support portions have slide surfaces, respectively, and the slide surface of the first coil support portion comes into contact with the slide surface of the second coil support portion, and the first and second coil support portions are movable with respect to each other along the slide surfaces while the slide surfaces come into contact with each other, thereby enabling the mutual relative positions of the first and second fixing portions to change.

In this way, the coil support body includes the first and second coil support portions, and the first and second coil support portions are movable with respect to each other along the slide surfaces. In this way, the mutual relative positions of the first and second fixing portions are changeable. As a result, the shape of the coil is changed, and thus an inductance value of the coil may be changed.

In another configuration example, the coil support body includes a central member having an outer circumference surface extending in a circumferential direction around the winding axis, and a cover member attachable and detachable to and from the central member to cover the outer circumference surface of the central member, the conductive wire is windable around the outer circumference surface of the central member when the cover member is not attached to the central member, and the conductive wire is windable around an outer circumference surface of the cover member when the cover member is attached to the central member, first and second grooves for disposing the conductive wire are provided as the plurality of types of fixing portions on the outer circumference surface of the central member and the outer circumference surface of the cover member, respectively, and the first and second grooves extend in spirals in directions of turning around the outer circumference surfaces, and the shape of the coil is changeable due to the inductance-changing mechanism being switchable between one state in which the conductive wire is disposed in the first groove on the outer circumference surface of the central member and another state in which the conductive wire is disposed in the second groove on the outer circumference surface of the cover member attached to the central member.

In this way, the shape of the coil may be changed by switching the inductance-changing mechanism between one state in which the conductive wire is disposed in the first groove on the outer circumference surface of the central member and another state in which the conductive wire is disposed in the second groove on the outer circumference surface of the cover member attached to the central member. In this way, an inductance value of the coil may be changed.

In another configuration example, a plurality of types of grooves for disposing the conductive wire is formed as the plurality of types of fixing portions on an outer circumference surface of the coil support body, and the grooves extend in spirals in directions of turning around the outer circumference surface, and the shape of the coil is changeable due to the inductance-changing mechanism being switchable between one state in which the conductive wire is disposed in any one of the plurality of types of grooves and another state in which the conductive wire is disposed in another type of groove.

In this way, the shape of the coil may be changed by switching the inductance-changing mechanism between one state in which the conductive wire is disposed in any one of the plurality of types of grooves and another state in which the conductive wire is disposed in another type of groove. In this way, an inductance value of the coil may be changed.

In another configuration example, holes having a plurality of types of array patterns are formed as the plurality of types of fixing portions on an outer circumference surface of the coil support body, the plurality of types of array patterns are array patterns for fixing the conductive wire using a plurality of types of arrangement patterns, respectively, fixing members for fixing the conductive wire are inserted into and attached to respective holes of each of the plurality of types of array patterns, and the shape of the coil is changeable due to the inductance-changing mechanism being switchable between one state in which the conductive wire is fixed by the fixing members attached to respective holes of any one of the plurality of types of array patterns and another state in which the conductive wire is fixed by the fixing members attached to respective holes of another array pattern.

In this way, the shape of the coil fixed by the fixing members attached to the holes may be changed by switching the inductance-changing mechanism between one state in which the conductive wire is fixed by the fixing members attached to respective holes of any one of the plurality of types of array patterns and another state in which the conductive wire is fixed by the fixing members attached to respective holes of another array pattern. In this way, an inductance value of the coil may be changed.

In another configuration example, the coil support body includes a main coil support portion and a sub-coil support portion attachable and detachable to and from the main coil support portion in a winding axis direction, first and second grooves for disposing the conductive wire are formed as the plurality of types of fixing portions on an outer circumference surface of the main coil support portion and an outer circumference surface of the sub-coil support portion, respectively, the first groove extending in a direction of turning around the outer circumference surface of the main coil support portion, the second groove extending in a direction of turning around the outer circumference surface of the sub-coil support portion, and the shape of the coil is changeable due to the inductance-changing mechanism being switchable between one state in which the conductive wire is disposed in the first groove of the main coil support portion corresponding to one of the main coil support portion and the sub-coil support portion and another state in which the conductive wire is disposed in the first groove of the main coil support portion and the second groove of the sub-coil support portion attached to the main coil support portion.

In this way, the shape of the coil may be changed by switching the inductance-changing mechanism between one state in which the conductive wire is disposed in the first groove of the main coil support portion corresponding to one of the main coil support portion and the sub-coil support portion and another state in which the conductive wire is disposed in the first groove of the main coil support portion and the second groove of the sub-coil support portion attached to the main coil support portion. In this way, an inductance value of the coil may be changed.

Hereinafter, embodiments of the disclosure will be described with reference to drawings. In description of the drawings, the same reference numeral will be applied to the same component, and repeated description will be omitted. First, a description will be given of a wireless power transfer system 1, to which a coil device according to a first embodiment is applied, with reference to FIG. 1. The wireless power transfer system 1 is a system (apparatus) for charging a battery installed in a vehicle such as an electric vehicle, a hybrid vehicle, etc.

The wireless power transfer system 1 includes a power transmitter 3 installed on a ground surface and a power receiver 4 provided on a vehicle 2 side. The power transmitter 3 is installed on the ground surface, and is configured to be able to transmit power (power for charging a battery 24) wirelessly to the power receiver 4 of the vehicle 2 when the vehicle 2, which runs on a ground, stops in a predetermined positional relationship (positional relationship in which an electromagnetic coupling circuit described below is formed).

The power transmitter 3 includes an external power supply 11, a rectifier circuit 12, a power transmission circuit 13, a power transmission coil device 14, etc. The external power supply 11 is a power supply that supplies power necessary to generate power to be transmitted to the vehicle 2. For example, the external power supply 11 is a power supply that supplies three-phase alternating current (AC) power whose voltage is 200 [V]. The external power supply 11 is not restricted to a three-phase AC power supply, and may be a power supply that supplies single-phase AC power such as a commercial AC power supply.

The rectifier circuit 12 is a circuit that rectifies AC power supplied from the external power supply 11, and converts the AC power into direct current (DC) power. A DC power supply such as a fuel cell, a solar cell, etc. may be used as the external power supply 11. In this case, the rectifier circuit 12 may be omitted.

The power transmission circuit 13 supplies power, which is supplied from the rectifier circuit 12, to the vehicle 2 wirelessly through an electromagnetic coupling circuit formed by the power transmission coil device 14 and a power reception coil device 25 provided in the vehicle 2. Specifically, for example, the power transmission circuit 13 includes an inverter circuit, and implements wireless power transfer to the vehicle 2 by inverting DC power from the rectifier circuit 12 into AC power, a frequency of which is higher than that of AC power of the external power supply 11, (high-frequency power) and feeding the inverted AC power to a power transmission coil portion 15 included in the power transmission coil device 14. That is, wireless power transfer is allowed by transmitting power from the power transmission coil portion 15 to a power reception coil portion 26 which is included in the power reception coil device 25 in the power receiver 4 of the vehicle 2. In addition, the power transmission circuit 13 may have a resonance capacitor included in a power transmission-side resonance circuit together with the power transmission coil portion 15 which is included in the power transmission coil device 14 on an output side of the inverter circuit.

The power transmission coil device 14 is installed on the ground surface, and includes the power transmission coil portion 15 and a power transmission-side shield plate (non-magnetic member) 16 inside a housing. As described in the foregoing, the power transmission coil portion 15 is a coil for feeding AC power supplied from the power transmission circuit 13 to the vehicle 2 wirelessly. For example, the power transmission coil portion 15 is formed by a solenoid coil having a coil shape and dimensions determined in advance. Details of the power transmission coil device 14 will be described below.

The power reception coil device 25 is provided in the vehicle 2, and includes the power reception coil portion 26 and a power reception-side shield plate (non-magnetic member) 27 inside a housing as described below. For example, the power reception coil portion 26 is formed by a solenoid coil having substantially the same coil diameter as that of the power transmission coil portion 15.

The electromagnetic coupling circuit is formed when the power transmission coil device 14 and the power reception coil device 25 provided in the vehicle 2 are positioned close to each other, and the power transmission coil portion 15 and the power reception coil portion 26 are positioned close to each other. The electromagnetic coupling circuit refers to a circuit in which the power transmission coil portion 15 is electromagnetically coupled to the power reception coil portion 26, and power is fed from the power transmission coil portion 15 to the power reception coil portion 26 wirelessly. The circuit may correspond to a circuit that performs power feeding using an "electromagnetic induction scheme" or a circuit that performs power feeding using an "electromagnetic resonance scheme". The power reception coil device 25 receives power (AC power) supplied from the power transmission coil device 14 wirelessly.

As illustrated in FIG. 1, the vehicle 2 includes the power receiver 4. Although not illustrated in FIG. 1, the vehicle 2 includes components necessary for driving such as a motor, an operating handle, a brake, etc. The power receiver 4 includes the power reception coil device 25, a power reception circuit 29, a charging circuit 30, and the battery 24. As described in the foregoing, the power reception coil device 25 includes the power reception coil portion 26 and the power reception-side shield plate 27. The power reception coil portion 26 is provided at the bottom of the vehicle 2 in a position in which coil axes are parallel to each other such that the power reception coil portion 26 may face the power transmission coil portion 15 of the power transmission coil device 14.

The power reception circuit 29 converts power from the power reception coil device 25 into DC power, and outputs the converted DC power to the charging circuit 30. The power reception circuit 29 may have a resonance capacitor included in a power reception-side resonance circuit together with the power reception coil portion 26. A capacitance of the resonance capacitor of the power reception circuit 29 may be set such that a resonance frequency of the power reception-side resonance circuit becomes the same frequency as a resonance frequency of the power transmission-side resonance circuit described above.

An input terminal of the charging circuit 30 is connected to an output terminal of the power reception circuit 29, and an output terminal of the charging circuit 30 is connected to an input terminal of the battery 24. Further, the charging circuit 30 converts power (DC power) from the power reception circuit 29 into desired power, and supplies the converted power to the battery 24. The battery 24 is a rechargeable battery (e.g., a secondary battery such as a lithium ion battery, a nickel hydride battery, etc.) installed in the vehicle 2, and supplies power to a drive motor (not illustrated), etc. The charging circuit 30 is configured to be controlled based on a control program for power reception prepared in advance by a power reception controller (not illustrated).

Figure 2A:
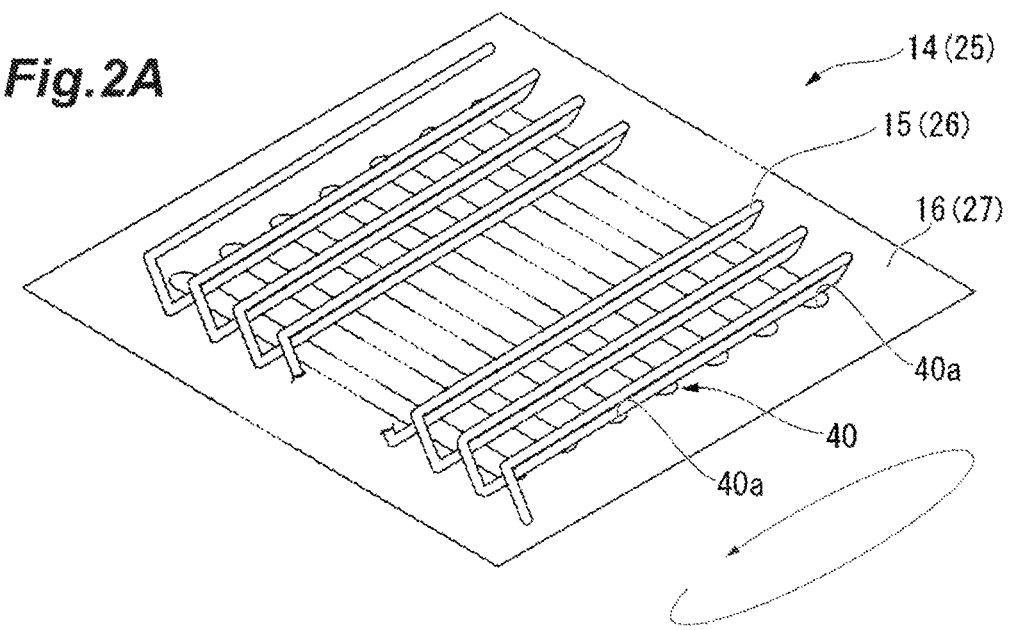
FIG. 2A is a perspective view schematically illustrating a power transmission coil device or a power reception coil device of FIG. 1.

Next, a detailed description will be given of the power transmission coil device 14 and the power reception coil device 25 according to the present embodiment. As illustrated in FIG. 2A, the power transmission coil device 14 includes the housing (not illustrated) and the power transmission coil portion 15 and the power transmission-side shield plate 16 disposed inside the housing. In the present embodiment, the power transmission coil portion 15 includes a solenoid coil having a coil shape and dimensions determined in advance, that is, a coil obtained by winding a conductive wire around a flat plate-shaped core member (not illustrated, e.g., ferrite) in a flat rectangular tubular shape. The power transmission coil portion 15 may include a circular coil as described below.

Figure 2B:
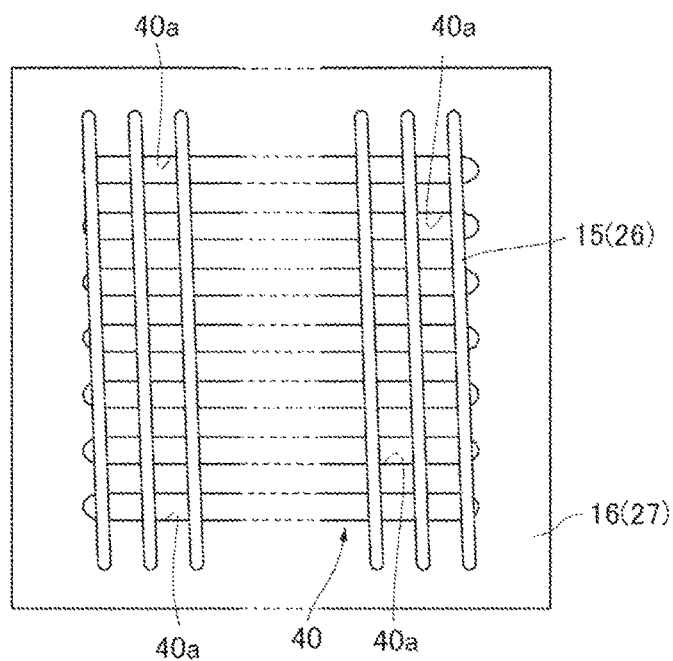
FIG. 2B is a plan view of FIG. 2A.

As illustrated in FIG. 2B, the solenoid type power transmission coil portion 15, in which the conductive wire is wound in the rectangular tubular shape, is formed in a rectangular shape in plan view. The power transmission-side shield plate 16 is a non-magnetic and conductive member, and is made of, for example, aluminum or copper. The power transmission-side shield plate 16 is disposed on the opposite side from a side of the power transmission coil portion 15 which faces the power reception coil portion 26 of the power reception coil device 25 illustrated in FIG. 1. The power transmission-side shield plate 16 is disposed to face the power transmission coil portion 15 such that the power transmission-side shield plate 16 is parallel to a coil axis of the power transmission coil portion 15. The power transmission-side shield plate 16 is configured to be easily attached to and detached from a position set in advance inside the housing (close to the power transmission coil portion 15). Alternatively, the power transmission-side shield plate 16 may be disposed outside the housing.

As illustrated in FIG. 2B, the power transmission-side shield plate 16 is formed in a rectangular shape sufficiently larger than a shape of the power transmission coil portion 15 in plan view, and is disposed immediately below the power transmission coil portion 15 such that the power transmission coil portion 15 is disposed inside in plan view. In addition, the power transmission-side shield plate 16 is disposed close to the power transmission coil portion 15, that is, is disposed with a slight gap interposed therebetween. Therefore, a counterclockwise eddy current indicated by an arrow of FIG. 2A or a clockwise eddy current is generated inside the power transmission coil portion 15 by the power transmission coil portion 15 in an opposite direction to a direction of a current of the power transmission coil portion 15.

Formation of the eddy current in the power transmission-side shield plate 16 affects an inductance of the power transmission coil portion 15, and thus the inductance of the power transmission coil portion 15 changes according to amplitude of the formed eddy current. In the present embodiment, as illustrated in FIGS. 2A and 2B, an eddy current interrupter 40 is formed to interrupt a portion of an eddy current formed in the power transmission-side shield plate 16 by the power transmission coil portion 15, and divert the portion, thereby changing a state of the eddy current.

In the present embodiment, the eddy current interrupter 40 is formed by a plurality of slits (long hole portions) 40a penetrating a surface and a rear surface of the power transmission-side shield plate 16. That is, the slits 40a penetrate through the power transmission-side shield plate 16 in a direction in which the power transmission coil device 14 faces the power reception coil device 25. The slits 40a are formed by extending in a direction substantially orthogonal to (direction intersecting with) a wound wire direction (extending direction) of the conductive wire that forms the power transmission coil portion 15. That is, the slits 40*a* are formed by extending in a direction along the coil axis (central axis) of the power transmission coil portion 15. In addition, the slits 40*a* are formed such that both ends thereof are positioned outside both ends of the power transmission coil portion 15 in the direction of the coil axis (central axis). That is, the slits 40*a* extrude outward from the power transmission coil device 14 in a direction orthogonal to the direction in which the power transmission coil device 14 faces the power reception coil device 25.

When the slits 40*a* are formed in this way, the slits 40*a* (eddy current interrupter 40) interrupt a portion of an eddy current formed in the power transmission-side shield plate 16 by the power transmission coil portion 15 to divert the portion of the eddy current, thereby changing a state of the eddy current when compared to a case in which the slits 40*a* are not present. That is, an inductance of the power transmission coil portion 15 may be changed by changing the state of the eddy current. In particular, since the both ends of the slits 40*a* are formed to be positioned outside the both ends of the power transmission coil portion 15 in the direction of the coil axis (central axis), a larger amount of the eddy current formed in the power transmission-side shield plate 16 may be interrupted to largely divert the eddy current, thereby more largely changing the state of the eddy current.

The power reception coil device 25 has substantially the same configuration as that of the power transmission coil device 14 illustrated in FIG. 2A, and includes the power reception coil portion 26 and the power reception-side shield plate 27 inside the housing (not illustrated). The power reception-side shield plate 27 is a non-magnetic and conductive member, and is made of, for example, aluminum or copper.

The power reception-side shield plate 27 is disposed on the opposite side from a side of the power reception coil portion 26 which faces the power transmission coil portion 15. The power reception-side shield plate 27 is disposed to face the power reception coil portion 26 such that the power reception-side shield plate 27 is parallel to a coil axis of the power reception coil portion 26. Similarly to the power transmission-side shield plate 16, an eddy current interrupter 40 including slits 40*a* is formed in the power reception-side shield plate 27. In this way, an inductance of the power reception coil portion 26 is changeable.

Herein, as illustrated in FIG. 2B, a plurality of slits 40*a* included in the eddy current interrupter 40 is formed to be parallel to one another at substantially equal intervals, extends in a direction along the coil axis (central axis) of the power transmission coil portion 15 (or the power reception coil portion 26), and is formed such that both ends thereof are positioned outside the both ends of the power transmission coil portion 15 (or the power reception coil portion 26). However, with regard to the slits 40*a*, various modes may be adopted when the slits 40*a* can interrupt a portion of an eddy current to divert the eddy current, thereby changing a state of the eddy current when compared to a case in which the slits 40*a* are not present.

Specifically, an arbitrary number (including one) of slits 40*a* may be formed. In addition, widths and lengths of the slits 40*a* are appropriately set according to a shape of the power transmission coil portion 15 or the power reception coil portion 26, etc. When the plurality of slits 40*a* is formed, widths or lengths of the slits 40*a* may be individually changed rather than being uniformly set. In addition, one slit 40*a* illustrated in FIG. 2B may be divided into a plurality of parts. In this case, widths or lengths of the divided slits are changeable. Further, the divided slits may be regularly or irregularly disposed. Furthermore, a thickness of a conductive plate that forms the power reception coil portion 26 or the power reception-side shield plate 27 may be changed to change a depth of a slit.

In addition, as a mode in which the slits 40*a* are extremely short, a hole may be simply formed and set as a component of the eddy current interrupter 40. In this case, an arbitrary number of holes may be arbitrarily disposed. The holes may be arranged in a length direction of the slits 40*a*, that is, in the direction along the coil axis (central axis) of the power transmission coil portion 15 (or the power reception coil portion 26). Alternatively, for example, the holes may be disposed in zigzags. In addition, the holes may be completely irregularly disposed. Alternatively, some holes may be regularly disposed, and the remaining holes may be irregularly disposed.

Next, a description will be given of a method of manufacturing the power transmission coil device 14 or the power reception coil device 25 including the power transmission-side shield plate 16 or the power reception-side shield plate 27 in which the eddy current interrupter 40 is formed. First, a plurality of conductive plates such as copper plates, etc. is prepared as a non-magnetic member of each of the power transmission-side shield plate 16 and the power reception-side shield plate 27.

Subsequently, the eddy current interrupter 40 is formed in the plurality of conductive plates, and the power transmission-side shield plate 16 and the power reception-side shield plate 27 serving as processed non-magnetic members are formed. However, a plurality of types of processed non-magnetic members (the power transmission-side shield plate 16 and the power reception-side shield plate 27) is formed by changing a form of the eddy current interrupter 40 formed in the plurality of conductive plates. Specifically, the number, widths, or lengths of slits are changed between conductive plates as described above, or widths or lengths of a plurality of slits formed in the same conductive plate are changed. Alternatively, some or all slits are changed to holes. Further, depths of slits are changed by preparing conductive plates having different thicknesses in advance.

Subsequently, the power transmission coil portion 15 is arranged inside the housing to assemble the power transmission coil device 14 and the power reception coil device 25 including the processed non-magnetic members (the power transmission-side shield plate 16 and the power reception-side shield plate 27). In addition, the power reception coil portion 26 is arranged inside the housing.

Subsequently, one of the plurality of types of processed non-magnetic members (the power transmission-side shield plate 16) is selected and disposed close to the power transmission coil portion 15. When the power transmission-side shield plate 16 is disposed close to the power transmission coil portion 15, and a current is applied to the power transmission coil portion 15, an eddy current is formed in the power transmission-side shield plate 16. An inductance of the power transmission coil portion 15 is affected by the formed eddy current and changes when compared to a case in which the eddy current interrupter 40 is not formed in the power transmission-side shield plate 16. That is, the inductance of the power transmission coil portion 15 is changeable when compared to a case where the power transmission-side shield plate 16, in which the eddy current interrupter 40 is not formed, is used.

Therefore, appropriate one of a plurality of types of processed non-magnetic members (the power transmission-side shield plate 16) prepared in advance is selected and disposed close to the power transmission coil portion 15 to adjust an inductance of a power transmission coil to a preset inductance.

In addition, with regard to the power reception coil device 25, similarly to the power transmission coil device 14, an inductance of the power reception coil portion 26 is adjusted by selecting appropriate one of a plurality of types of processed non-magnetic members (the power reception-side shield plate 27) prepared in advance and disposing the selected one close to the power reception coil portion 26. In this way, the power transmission coil device 14 and the power reception coil device 25 may be obtained by appropriately selecting the power transmission-side shield plate 16 and the power reception-side shield plate 27, respectively.

Herein, a description will be given of changing of an inductance of the above-described coil disclosed in Patent Literature 2. When the shield is formed using a non-magnetic body (aluminum, copper, etc.), an inductance decreases as the shield is moved closer to the coil. For example, when an inductance needs to be increased to achieve a desired inductance, the shield is moved away from coil. Thus, a coil device increases in size. Meanwhile, it is desired to suppress the increase in size of the coil device due to a restriction on a place in which a power transmitter or a power receiver including the coil device is installed.

According to the power transmission coil device 14 or the power reception coil device 25 of the present embodiment described above, when the eddy current interrupter 40 is provided in the power transmission-side shield plate 16 (or the power reception-side shield plate 27), a portion of an eddy current generated in the power transmission-side shield plate 16 is interrupted, and flows to bypass the eddy current interrupter 40. In this way, a distance for which the eddy current flows becomes longer, a magnetic reluctance increases, and the eddy current becomes smaller. In this way, eddy current-dependent magnetic fluxes that cancel out magnetic fluxes generated by the power transmission coil device 14 are reduced, and an inductance increases. In this way, even when the power transmission-side shield plate 16 is moved closer to the power transmission coil device 14 (that is, the conductive wire), a desired inductance is achieved by appropriately adjusting a decrease in inductance due to the power transmission-side shield plate 16 moved closer to the power transmission coil device 14 and an increase in inductance due to the eddy current interrupter 40. An increase in size of the device is suppressed using the increase in inductance due to the eddy current interrupter 40.

When the slits 40a serving as the eddy current interrupter 40 are provided in the power transmission-side shield plate 16, a portion of an eddy current may be reliably and easily interrupted and a path of the eddy current may be changed in the power transmission-side shield plate 16. When the slits 40a corresponding to through-holes are provided, an air passes through the power transmission-side shield plate 16, and an increase in temperature of the shield is suppressed.

In addition, the slits 40a protrude outward from the power transmission coil portion 15 in a direction orthogonal to a direction in which the slits 40a face the power reception coil device 25. In this case, a larger amount of eddy current is interrupted, and an alternative route of the eddy current increases. Therefore, an inductance may be further increased.

The slits 40a extend in a direction intersecting with the extending direction of the conductive wire in the power transmission coil device 14. An eddy current is prone to flow along the conductive wire (in the opposite direction to a direction of a current flowing through the conductive wire). Therefore, according to the slits 40a extending in a direction intersecting with the flow, an alternative route of the eddy current is maximized. That is, a variation width of an inductance is maximized.

An inductance may be changed by changing a shape of the coil portion. Meanwhile, there is concern that a physical change of the coil portion may cause damage to the coil portion. The coil portion is a portion that performs power transmission wirelessly, and damage to the coil portion affects transmission ability thereof. In the present embodiment, an inductance is changed by providing the eddy current interrupter 40 in the power transmission-side shield plate 16, and the coil portion itself is not changed. Therefore, transmission ability in the coil portion is not affected.

When the eddy current interrupter including the slits 40a is provided in the non-magnetic member as in the above embodiment, hard metal (aluminum or copper) may be used rather than a relatively weak magnetic body (e.g., ferrite). Therefore, the eddy current interrupter may be inhibited from being broken or cracked when the slits are provided.

In addition, according to the above-described manufacturing method, the form of the eddy current interrupter 40 is changed to form a plurality of types of processed non-magnetic members (the power transmission-side shield plate 16 and the power reception-side shield plate 27), and select one of the processed non-magnetic members. In this way, an inductance of the power transmission coil portion 15 or the power reception coil portion 26 may be adjusted simply through exchange of the processed non-magnetic members (the power transmission-side shield plate 16 and the power reception-side shield plate 27). Therefore, for example, an inductance of the power transmission coil portion 15 or the power reception coil portion 26 may be easily adjusted even after the power transmission coil device 14 or the power reception coil device 25 is fabricated. In particular, it is effective when a processed non-magnetic member is disposed outside the housing of the power transmission coil device 14 or the power reception coil device 25. Therefore, manufacturing costs may be reduced.

In addition, the eddy current interrupter 40 is implemented using the slits 40a, and the slits 40a are formed in a direction that intersects with a direction in which the conductive wire of the power transmission coil portion 15 or the power reception coil portion 26 is wound. In this way, an eddy current formed in the power transmission-side shield plate 16 or the power reception-side shield plate 27 may be more efficiently interrupted, and an inductance of the power transmission coil portion 15 or the power reception coil portion 26 may be more largely changed. In this way, it is possible to more effectively adjust an inductance of the power transmission coil portion 15 or the power reception coil portion 26 by the power transmission-side shield plate 16 or the power reception-side shield plate 27.

In addition, the slits 40a are formed such that the both ends thereof are positioned outside the both ends of the power transmission coil portion 15 or the power reception coil portion 26 in the direction of the coil axis (central axis). In this way, it is possible to more efficiently interrupt an eddy current formed in the power transmission-side shield plate 16 or the power reception-side shield plate 27. Therefore, it is possible to more largely change an inductance of the power transmission coil portion 15 or the power reception coil portion 26.

In addition, since the eddy current interrupter 40 is formed in the power transmission-side shield plate 16 or the power reception-side shield plate 27, and a path of an eddy current is changed as described above, it is possible to reduce loss resulting from heat generation, etc. due to the eddy current, thereby increasing power transmission efficiency particularly when the path of the eddy current is made short.

Figure 3A:
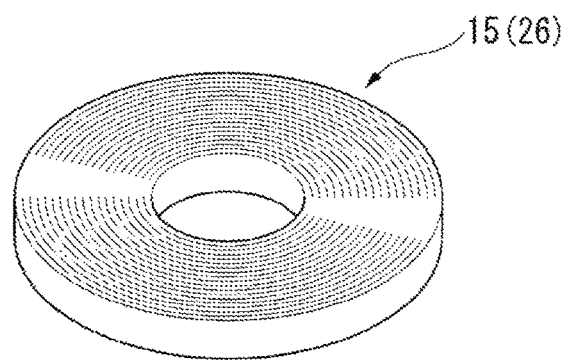
FIG. 3A is a perspective view illustrating a coil device of a second embodiment.

Next, a second embodiment will be described with reference to FIG. 3. In the first embodiment, a power transmission coil and or a power reception coil is formed using a solenoid coil obtained by winding a conductive wire in a flat rectangular tubular shape. However, as illustrated in FIG. 3A, the coil may be formed using a circular coil obtained by winding a conductive wire in a circular spiral within the same plane.

Figure 3B:
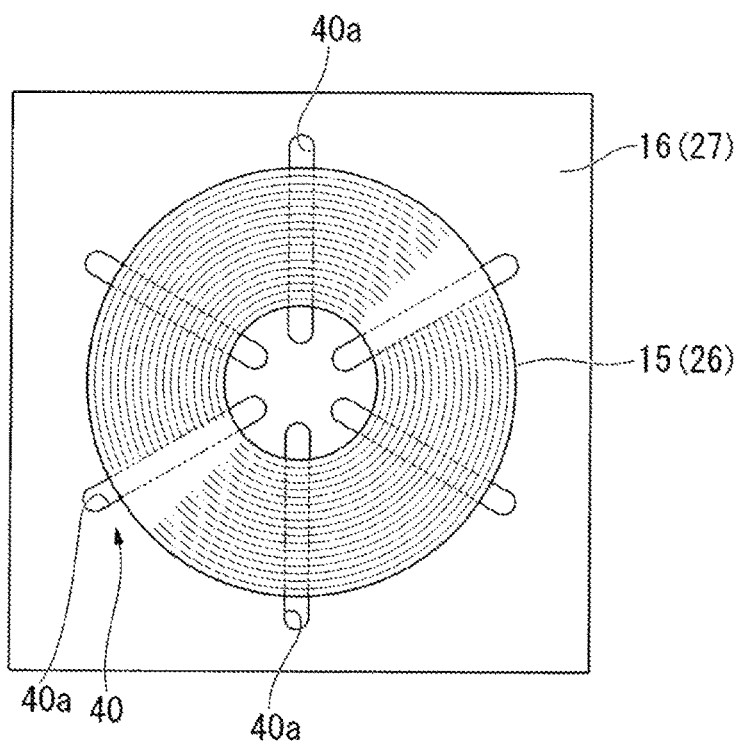
FIG. 3B is a plan view schematically illustrating a schematic configuration of a power transmission coil device or a power reception coil device according to the second embodiment.

In this case, an eddy current interrupter 40 is formed as a power transmission-side shield plate 16 or a power reception-side shield plate 27 disposed close to a power transmission coil portion 15 or a power reception coil portion 26 having the above-described circular type. As illustrated in FIG. 3B, a plurality of slits 40a is formed as the eddy current interrupter 40. The plurality of slits 40a is preferably formed to extend in a radial direction from a center of the power transmission coil portion 15 (the power reception coil portion 26) (six slits in an example illustrated in FIG. 3B). In addition, in this case, the slits 40a are preferably formed such that both ends thereof are positioned to extend from insides of the power transmission coil portion 15 (the power reception coil portion 26) up to outsides of the power transmission coil portion 15 (the power reception coil portion 26). In the circular coil, a core member (e.g., ferrite) may be disposed between the power transmission coil portion 15 (the power reception coil portion 26) and the power transmission-side shield plate 16 (the power reception-side shield plate 27).

Similar effects to those of the first embodiment are achieved when the power transmission coil portion 15 or the power reception coil portion 26 having the circular type is used. A form of the eddy current interrupter 40 may be changed to form a plurality of types of processed non-magnetic members (the power transmission-side shield plate 16 and the power reception-side shield plate 27), and one of the processed non-magnetic members may be selected to adjust an inductance of the power transmission coil portion 15 or the power reception coil portion 26. Therefore, for example, an inductance of the power transmission coil portion 15 or the power reception coil portion 26 may be easily adjusted even after the power transmission coil device 14 or the power reception coil device 25 is fabricated. Accordingly, manufacturing costs may be reduced.

In addition, since the eddy current interrupter 40 is formed using the slits 40a, and the slits 40a are formed in the radial direction from the center of the power transmission coil portion 15 or the power reception coil portion 26, it is possible to more efficiently interrupt an eddy current formed in the power transmission-side shield plate 16 or the power reception-side shield plate 27. Therefore, an inductance of the power transmission coil portion 15 or the power reception coil portion 26 may be more largely changed by more largely diverting the formed eddy current. In this way, it is possible to more effectively adjust an inductance of the power transmission coil portion 15 or the power reception coil portion 26 by the power transmission-side shield plate 16 or the power reception-side shield plate 27.

Further, since the slits 40a are formed such that the both ends thereof are positioned to extend from the insides of the power transmission coil portion 15 or the power reception coil portion 26 up to the outsides thereof, an eddy current formed in the power transmission-side shield plate 16 or the power reception-side shield plate 27 may be more efficiently interrupted in this way. Therefore, an inductance of the power transmission coil portion 15 or the power reception coil portion 26 may be more largely changed.

Figure 4A:
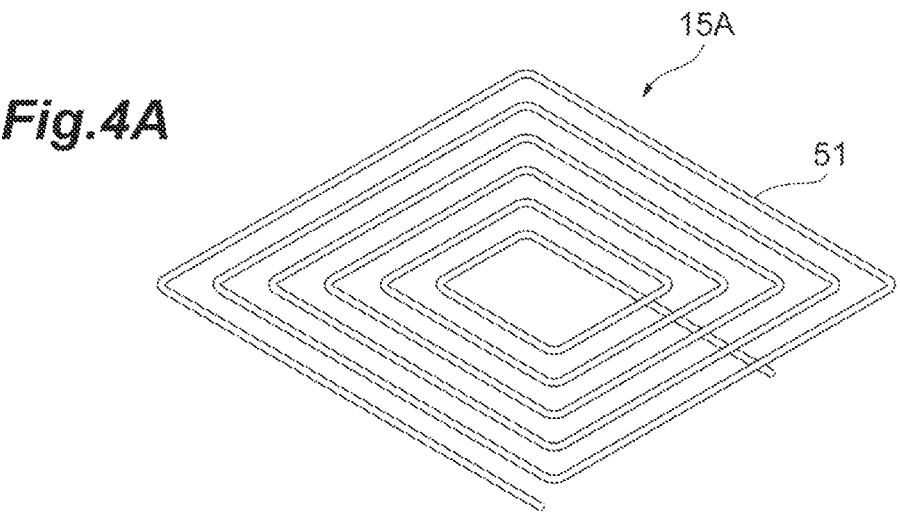
FIG. 4A is a perspective view illustrating a coil device of a third embodiment.
Figure 4B:
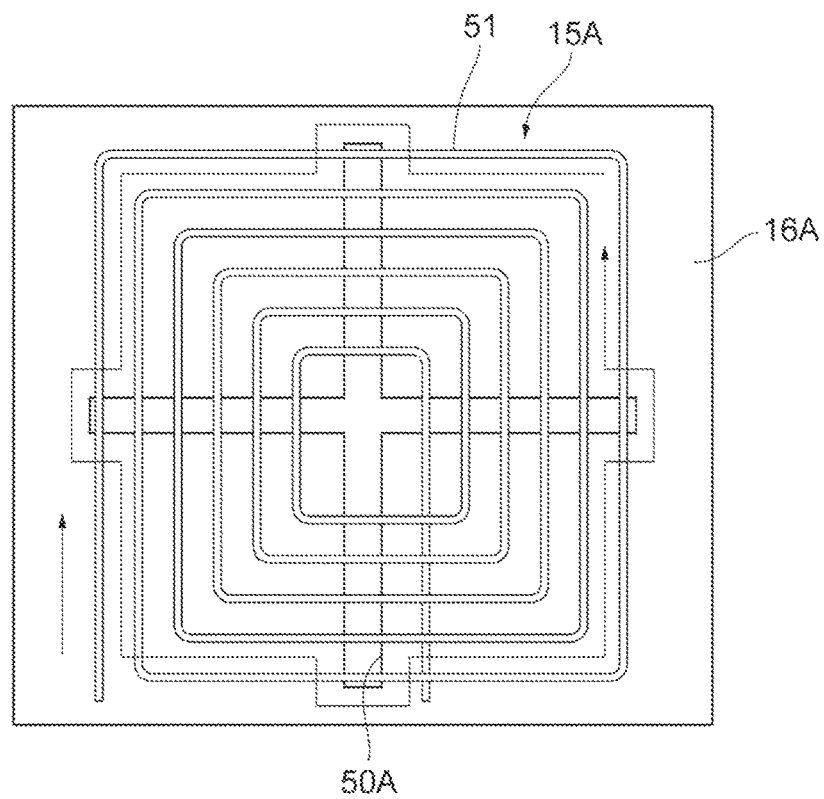
FIG. 4B is a plan view schematically illustrating a schematic configuration of a power transmission coil device or a power reception coil device according to the third embodiment.

Next, a third embodiment will be described with reference to FIG. 4. In a coil portion 15A of the third embodiment, a conductive wire 51 is wound in a rectangular spiral. That is, the coil portion 15A is a circular coil having a rectangular shape. In this case, a cross-shaped slit 50A is provided as an eddy current interrupter in a power transmission-side shield plate 16A. The slit 50A extends in a direction substantially orthogonal to an extending direction of the conductive wire 51. In addition, the slit 50A extends outward from a region in which the coil portion 15A (conductive wire 51) is provided.

According to the above-described coil device in which the power transmission-side shield plate 16A is provided, an eddy current formed in the power transmission-side shield plate 16A may be more efficiently interrupted by the slit 50A (see an arrow indicated in FIG. 4B), and an inductance of the coil portion 15A may be largely changed.

Next, a fourth embodiment will be described with reference to FIG. 5. In a coil device of the fourth embodiment, a solenoid coil portion 15B including a conductive wire 52 is provided inside a housing that includes a base 54 and a protective cover 55. Two shield plates corresponding to a first shield plate (first non-magnetic member) 56a and a second shield plate (second non-magnetic member) 56b are provided between the coil portion 15B and the base 54. A sheet-shaped member 53 is interposed between the first shield plate 56a and the second shield plate 56b. The first shield plate 56a and the second shield plate 56b may slidably move with respect to each other.

Further, first moving portions 57a and 57b are provided between the first shield plate 56a and the protective cover 55, that is, at both end portions of the first shield plate 56a. Second moving portions 57a and 57b are provided between the second shield plate 56b and the protective cover 55, that is, at both end portions of the second shield plate 56b. For example, the moving portions include screw members such as bolts, etc. and are made of a non-magnetic material. The first moving portion 57a and the second moving portion 57b may be controlled to rotate from an outside of the protective cover 55, and the first moving portion 57a and the second moving portion 57b are moved by the rotation. A moving mechanism 57 of the present embodiment includes the first moving portion 57a and the second moving portion 57b. A configuration of the moving mechanism is not restricted to a mode in which a screw member is used.

Furthermore, a plurality of parallel slits 58B is formed in each of the first shield plate 56a and the second shield plate 56b. Each of the slits 50B extends in a direction substantially orthogonal to an extending direction of the conductive wire 52. The slits 50B formed in the first shield plate 56a and the slits 50B formed in the second shield plate 56b are formed in similar patterns. More specifically, the slits 50B formed in the first shield plate 56a and the slits 50B formed in the second shield plate 56b have the same size and the same shape. In addition, the number of slits 50B formed in the first shield plate 56a is the same as the number of slits 50B formed in the second shield plate 56b.

The sheet-shaped member 53 may be made of a non-conductive material or a conductive material. When the sheet-shaped member 53 corresponds to the non-conductive material, magnetic fluxes penetrate the second shield plate 56b via the slits 50B of the first shield plate 56a and the sheet-shaped member 53. The number of magnetic fluxes penetrating the second shield plate 56b changes according to a difference in area of the second shield plate 56b overlapping the slits 50B of the first shield plate 56a. Thus, a magnitude of an eddy current generated in the second shield plate 56b changes. In this way, an inductance is changed.

The first shield plate 56a and the second shield plate 56b may directly come into contact with each other without the sheet-shaped member 53 being provided between the first shield plate 56a and the second shield plate 56b.

In addition, when the sheet-shaped member 53 is conductive, the same effect as that in a case, in which the first shield plate 56a and the second shield plate 56b directly come into contact with each other, is obtained. Herein, when the first shield plate 56a and the second shield plate 56b directly come into contact with each other while the first shield plate 56a and the second shield plate 56b are uneven, an electric contact between the first shield plate 56a and the second shield plate 56b may be insufficient. Then, an eddy current generated in the first shield plate 56a rarely moves to the second shield plate 56b. Therefore, a path of an eddy current is rarely changed even when an overlapping state of the slits 50B of both the shield plates 56a and 56b is changed.

When the conductive sheet-shaped member 53 is provided, the sheet-shaped member 53 preferably closely touches (that is, is in close contact with) the first shield plate 56a and the second shield plate 56b. When the sheet-shaped member 53 capable of being in close contact with an uneven shape of the first shield plate 56a and the second shield plate 56b is provided, an electrical contact between the first shield plate 56a and the second shield plate 56b may be ensured. The sheet-shaped member 53 preferably corresponds to a deformable material. For example, the sheet-shaped member 53 corresponds to a gel-like material containing metal powder.

Figure 6A:
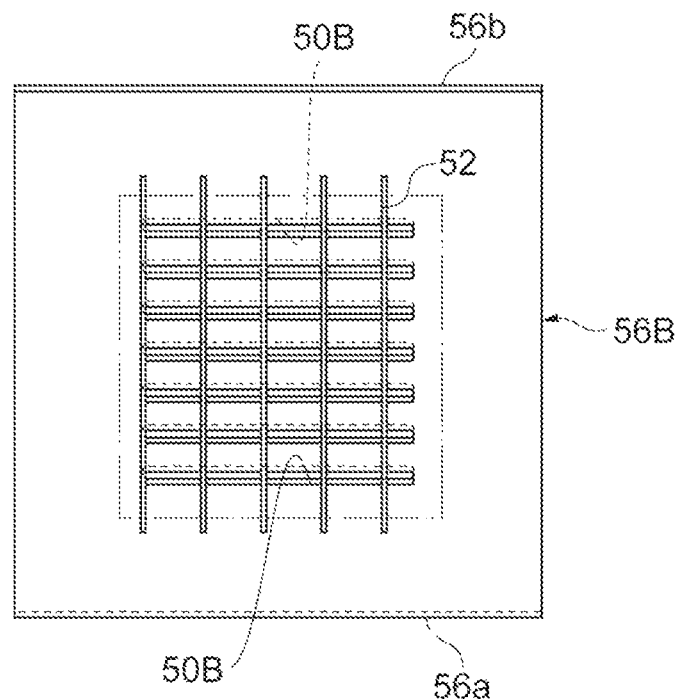
FIG. 6A is a plan view illustrating a state in which a non-magnetic member is moved in the coil device illustrated in FIG. 5.
Figure 6B:
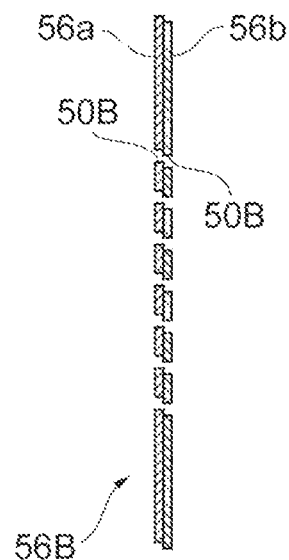
FIG. 6B is a cross-sectional view of FIG. 6A.

In the coil device having the above-described configuration, as illustrated in FIGS. 6A and 6B, the slits 50B and 50B are overlapped between the first shield plate 56a and the second shield plate 56b, thereby allowing communication. The overlapping state of the slits 50B and 50B may be changed by slidably moving one of or both the first shield plate 56a and the second shield plate 56b using the moving mechanism 57. That is, a form of the eddy current interrupter which is formed by the slits 50B is changed by appropriately shifting the shield plates as necessary to change widths or lengths of the slits B. Herein, for example, a direction of movement by the moving mechanism 57 is a width direction of the slits 50B, that is, a direction orthogonal to a direction in which the coil device of FIG. 5 faces a coil device for wireless power transfer. The orthogonal direction is not strictly restricted to a direction that forms 90° with the facing direction, and includes a case in which the first and second shield plates 56a and 56b obliquely move when the first and second shield plates 56a and 56b are obliquely disposed with respect to the facing direction.

According to the fourth embodiment, the slits 50B and 50B serving as eddy current interrupters are provided in the first shield plate 56a and the second shield plate 56b. Thus, when the first shield plate 56a and/or the second shield plate 56b is slidably moved by the moving mechanism 57, a positional relationship between the conductive wire 52 of the coil portion 15B and the slits 50B is changed, and a path of an eddy current is changed. More specifically, an inductance is reduced when areas of through-holes are decreased by the slits 50B and 50B overlapping each other. In this way, the inductance may be adjusted to a desired inductance.

When respective positions of the first shield plate 56a and the second shield plate 56b are adjusted, the overlapping state of the slits 50B and 50B serving as the eddy current interrupters may be changed. In this way, a path of an eddy current is changed. An adjustment range of an inductance is widened as a whole power transmission-side shield plate 56B when compared to a case in which one non-magnetic member is used.

Since the slits 50B of the first shield plate 56a and the slits 50B of the second shield plate 56b are formed in similar patterns, the overlapping state of the slits 50B and 50B may be easily adjusted by moving one of the first shield plate 56a and the second shield plate 56b. Therefore, it is easy to adjust an inductance as the whole power transmission-side shield plate 56B.

In addition, in a process of manufacturing the coil device of the fourth embodiment, a pair of conductive plates is mutually shifted, and the form of the eddy current interrupter is changed. As a result, a plurality of types of processed non-magnetic members may be prepared. Therefore, when an appropriate one is selected from the plurality of types of processed non-magnetic members prepared in this way, that is, processed non-magnetic members having eddy current interrupters in which widths or lengths of slits are changed, an inductance of the power transmission coil portion 15 or the power reception coil portion 26 may be easily adjusted to a preset inductance.

When the plurality of types of processed non-magnetic members, in which the form of the eddy current interrupter is changed using the pair of conductive plates, is prepared in this way, the number of conductive plates necessary for the prepared processed non-magnetic members may be reduced, and thus costs may be reduced. In addition, the form of the eddy current interrupter may be gradually changed into a large number of different forms by mutually shifting the pair of conductive plates. Therefore, an inductance of the power transmission coil portion 15 or the power reception coil portion 26 may be further approximated to a preset inductance.

The coil device of the fourth embodiment has an advantageous effect in comparison with the above-described invention of Patent Literature 1. Patent Literature 1 discloses that an inductance is changed by changing the number of shields. However, according to the fourth embodiment, an inductance may be adjusting using a minimum of two shields without entailing an increase in the number corresponding to three or more shields, and further miniaturization may be achieved.

In the coil device of the fourth embodiment, a shield is implemented using hard metal (aluminum or copper) without a relatively weak magnetic body being moved, thereby suppressing breakage or a crack due to movability.

Figure 7A:
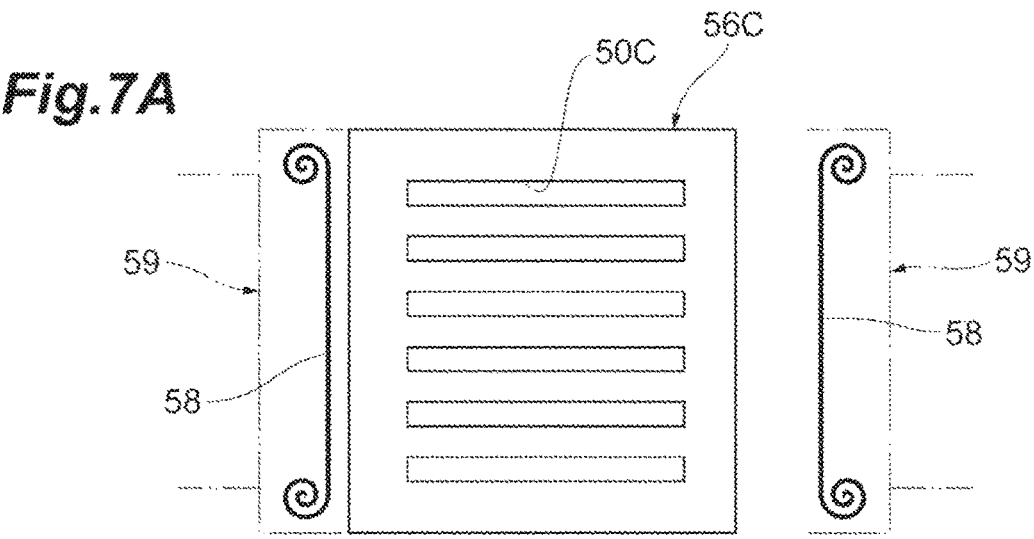
FIG. 7A is a plan view schematically illustrating a coil device according to a fifth embodiment.
Figure 7B:
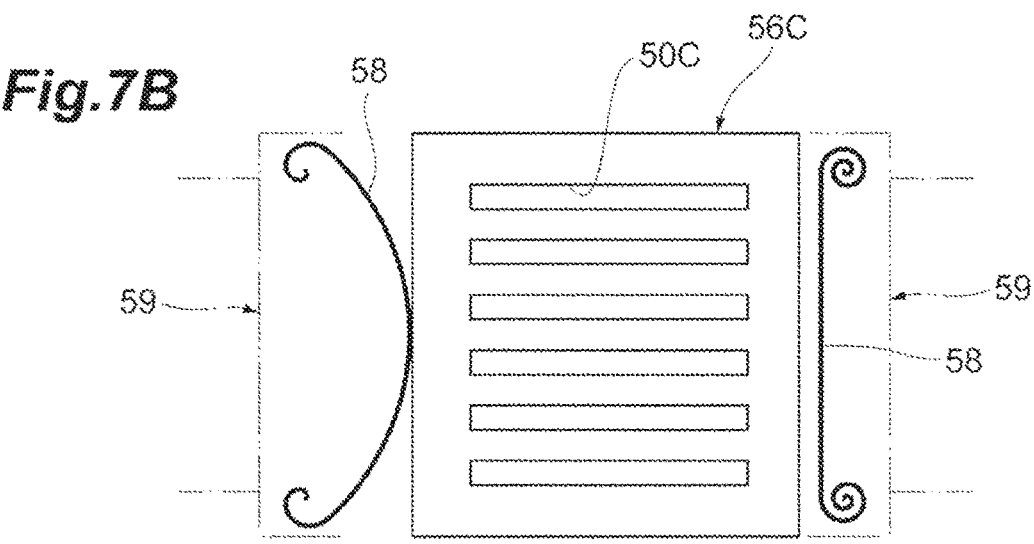
FIG. 7B is a plan view illustrating a state in which a non-magnetic member is moved by a moving mechanism of the coil device of FIG. 7A.

Next, a fifth embodiment will be described with reference to FIG. 7. As illustrated in FIG. 7A, in a coil device of the fifth embodiment, a plurality of parallel slits 50C is provided in a power transmission-side shield plate 56C. An extending direction of the slits 50C and a region in which the slits 50C are provided are similar to those of the first embodiment and the fourth embodiment which employ the solenoid coils. In the fifth embodiment, bimetals 58 deformed according to a temperature change are provided as a moving mechanism of the power transmission-side shield plate 56C. More specifically, the bimetals 58 longer than a length of one side of the power transmission-side shield plate 56C are provided at both end portions of the power transmission-side shield plate 56C to face each other. Both ends of the bimetal 58 are fixed to pins, etc. (not illustrated) around corners of the power transmission-side shield plate 56C, and are normally wound around the pins, etc.

Further, for example, a cooling device (movement control mechanism) 59 including a Peltier device is connected to the bimetal 58. When a temperature of the bimetal 58 is controlled by the cooling device 59, the power transmission-side shield plate 56C is pressed by deformation of the bimetal 58, and is moved for a predetermined distance. In this way, the cooling device 59 adjusts a moving distance of the power transmission-side shield plate 56C. According to the cooling device 59, a direction of movement of heat may be controlled by reversing a polarity of a current passing through the cooling device 59, thereby switching between heat absorption and heat release. In particular, a temperature of an inside of the coil device is prone to rise due to heat generation in an eddy current or a conductive wire. Thus, it is more important to cool the bimetal 58 than to heat the bimetal 58 in controlling a temperature of the bimetal 58.

According to the coil device described above, when the power transmission-side shield plate 56C is moved by the bimetal 58, a positional relationship between an eddy current interrupter and a conductive wire of the coil portion is changed, and a path of an eddy current is changed. Therefore, an inductance may be adjusted to a desired inductance by moving the power transmission-side shield plate 56C. Further, a moving distance of the power transmission-side shield plate 56C may be actively controlled by the cooling device 59.

Figure 8A:
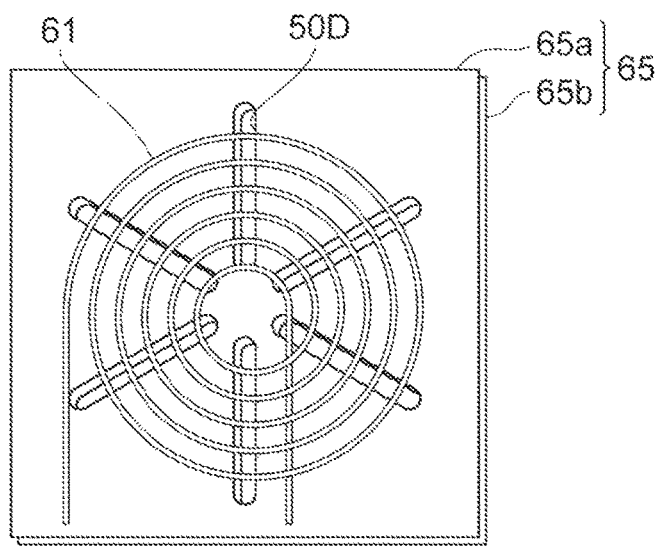
FIGS. 8A to 8C are diagrams illustrating various modes of non-magnetic members corresponding to different types of coil portions.

Hereinbefore, the embodiments of the disclosure have been described. However, the disclosure is not restricted to the above embodiments. For example, as illustrated in FIG. 8A, two shield plates corresponding to a first shield plate 65a and a second shield plate 65b in which six radially extending slits 50D are provided may be used in a circular coil obtained by winding a conductive wire 61 in a circular spiral. The slits 50D extend in a direction substantially orthogonal to an extending direction of the conductive wire 61 (that is, a tangential direction of the arc-shaped conductive wire 61). A moving mechanism or a cooling device may be applied to the above-described power transmission-side shield plate 65. According to the above-described coil device, the same effects as those of the fourth embodiment may be achieved.

Figure 8B:
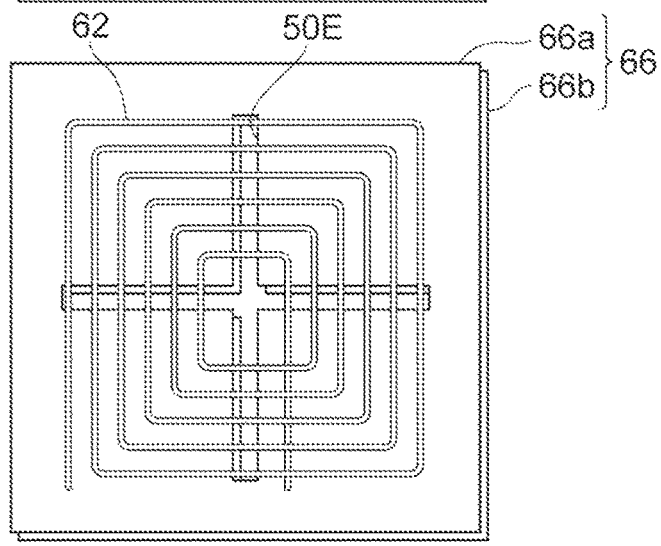

As illustrated in FIG. 8B, two shields plates corresponding to a first shield plate 66a and a second shield plate 66b in which a cross-shaped slit 50E is provided may be used in a circular coil obtained by winding a conductive wire 62 in a rectangular spiral. The slit 50E extends in a direction substantially orthogonal to an extending direction of the conductive wire 62. A moving mechanism or a cooling device may be applied to the above-described power transmission-side shield plate 66. According to the above-described coil device, the same effects as those of the fourth embodiment may be achieved.

Figure 8C:
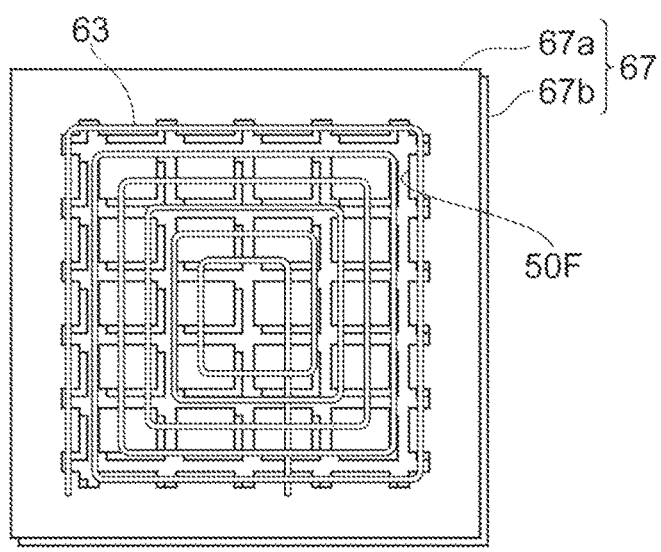

As illustrated in FIG. 8C, two shields plates corresponding to a first shield plate 67a and a second shield plate 67b in which a lattice-shaped slit 50F is provided may be used in a circular coil obtained by winding a conductive wire 63 in a rectangular spiral. The slit 50F extends in a direction substantially orthogonal to an extending direction of the conductive wire 63. A moving mechanism or a cooling device may be applied to the above-described power transmission-side shield plate 67. According to the above-described coil device, the same effects as those of the fourth embodiment may be achieved.

In the above embodiments, a description has been given of a case in which a slit corresponding to a long hole portion is formed in a non-magnetic shield as an eddy current interrupter. However, the disclosure is not restricted to the long hole portion. A circular or oval hole portion may be provided, and a square hole portion may be provided. In addition, the eddy current interrupter is not restricted to a case in which a through-hole such as a slit is formed, and a depressed portion that does not penetrate a plate may be provided. A groove portion which is a depressed portion extending in a predetermined direction may be formed as the eddy current interrupter. In these cases, the depressed portion is formed in a shape recessed in a facing direction of a coil device.

The slit or the groove portion is not restricted to a case in which the slit or the groove portion extends in a direction orthogonal to an extending direction of a conductive wire. The slit or the groove portion may extend in a direction that forms an angle other than 90° (a direction that forms an acute angle). When two shield plates are used, the hole portion or the depressed portion may be formed in different patterns. The hole portion or the depressed portion (eddy current interrupter) may be formed in a shield plate on a side close to a facing coil device, and the hole portion or the depressed portion (eddy current interrupter) may not be formed in a shield plate on a side away from the facing coil device. According to a configuration in which an eddy current interrupter is provided in one shield plate and any eddy current interrupter is not provided in the other shield plate, magnetic field emission may be reduced. In addition, the shield plate in which any eddy current interrupter is not provided (the other shield plate) may not be formed using the same material, and may be formed using a different material for each region. In this case, an inductance may be changed according to a material of a region of the other shield plate that overlaps the eddy current interrupter of the one shield plate.

A water-cooling or air-cooling device may be combined with the bimetal 58 of the fifth embodiment as a movement control mechanism. A pneumatic actuator may be used as a moving mechanism. In this case, it is possible to employ a configuration that includes a pump.

In the above embodiments, a description has been given on the assumption that the moving mechanism moves a plurality of shield plates. However, the moving mechanism may be provided to move one shield plate. A position of the eddy current interrupter provided in the shield plate with respect to the coil portion is changed by movement of the one shield plate. In this way, a position at which an eddy current is interrupted (or a path of an eddy current) is changed, and thus an inductance is changed accordingly.

In the above embodiments, a description has been given of a case in which the wireless power transfer system is applied to a system (apparatus) for charging a battery installed in a vehicle (moving body) such as an electric vehicle, a hybrid vehicle, etc. However, the disclosure is not restricted thereto. For example, the disclosure is applicable to a wireless power transfer system for charging a battery provided in consumer appliances such as a household electric appliance, etc., a wireless power transfer system for supplying power for driving industrial equipment (e.g., a stage, an arm, a crane, a robot, etc.), etc. The disclosure is applicable to an induction heating system.

The coil device, which is a mode of the disclosure, is applicable to a power transmission-side coil device and a power reception-side coil device.

[Sixth Embodiment]

FIG. 9 to FIG. 15 illustrate Configuration Examples 1 to 5 of an inductance-changing mechanism 110 according to a sixth embodiment of the disclosure. The inductance-changing mechanism 110 is used to change an inductance of a coil 103 included in an electric circuit.

When an electric circuit includes a coil, a manufacturing error occurs in a component related to the coil (e.g., a thickness, a length, or a density of a conductive wire and a magnetic property of a core of the coil). As a result, an inductance value of the coil may be out of a preferable range. In this way, for example, a current flowing through the electric circuit or a voltage generated inside the electric circuit may exceed a threshold value (a withstand current or a withstand voltage of the electric circuit) according to an inductance value of the coil. In addition, power transmission efficiency in an electric circuit for transmitting power (e.g., the above-described wireless power transfer circuit or wireless power reception circuit) may be lower than a reference value according to an inductance value of the coil.

When an inductance value of a coil is not within a preferable range, the inductance value of the coil needs to be changed. To this end, a conventional technology uses a magnetic body disposed inside the coil. Patent Literature 4 changes a length in which a magnetic body disposed inside a coil is inserted into the coil. Patent Literature 5 changes a type of a magnetic body disposed inside a coil.

However, in the above-described apparatus that changes an inductance value, an inductance of the coil cannot be changed using the magnetic body inside the coil when the magnetic body is not disposed inside the coil.

In the present embodiment, a description will be given of a new inductance-changing mechanism capable of changing an inductance of a coil of an electric circuit without using a magnetic body when the magnetic body is disposed inside the coil of the electric circuit or when the magnetic body is not disposed inside the coil of the electric circuit.

For example, a current flowing through the electric circuit or a voltage generated inside the electric circuit may be adjusted to smaller than or equal to a threshold value, or power transmission efficiency in the electric circuit for transmitting power may be increased by changing an inductance. For example, the electric circuit may correspond to the above-described wireless power transfer circuit or wireless power reception circuit, or another electric circuit.

The inductance-changing mechanism 110 includes a coil support body 105 that supports the coil 103. The coil 103 is formed by a conductive wire 107 that extends to turn around a winding axis C of the coil support body 105. The winding axis C is an axis of the coil support body 105 which is identical to an axis of the coil 103. Although not illustrated, an outer surface of the conductive wire 107 is preferably covered with an insulating film.

The coil support body 105 has first and second fixing portions 109 and 111 to which both end portions of the coil 103 are fixed. Here, relative positions of the first and second fixing portions 109 and 111 are changeable. The first fixing portion 109 corresponds to a region of the coil support body 105 on one end side (e.g., one end portion), and the second fixing portion 111 corresponds to a region of the coil support body 105 on the other end side (e.g., the other end portion). In addition, the conductive wire 107 that forms the coil 103 extends in a spiral from the first fixing portion 109 to the second fixing portion 111 to turn around the winding axis C.

An appropriate means may fix one end portion of the coil 103 to the first fixing portion 109. For example, one end portion of the coil 103 may be fixed to the first fixing portion 109 by attaching the one end portion of the coil 103 to the fixing portion using an adhesive tape. Alternatively, the one end portion of the coil 103 may be fixed to the first fixing portion 109 by inserting the one end portion of the coil 103 in a clip attached to the first fixing portion 109. A means for fixing the other end portion of the coil 103 to the second fixing portion 111 is similar to the above-described means.

According to the sixth embodiment, mutual relative positions of the first and second fixing portions 109 and 111 are changeable. In this way, an inductance value of the coil 103 may be changed by changing a shape of the coil 103. In this way, a desired inductance may be achieved.

In the electric circuit, the one end portion and the other end portion of the coil 103 are electrically connected to other places P1 and P2 of the electric circuit which includes the coil 103 through a conductive wire for connection 113. The conductive wire for connection 113 is loosened to be able to respond to extension of the coil support body 105 or to be able to respond to a change of a whole length of the conductive wire that forms the coil 103.

The above description corresponds to Configuration Examples 1 to 5 illustrated in FIG. 9 to FIG. 15. Hereinafter, Configuration Examples 1 to 5 will be successively described in detail.

(Configuration Example 1)

Figure 9A:
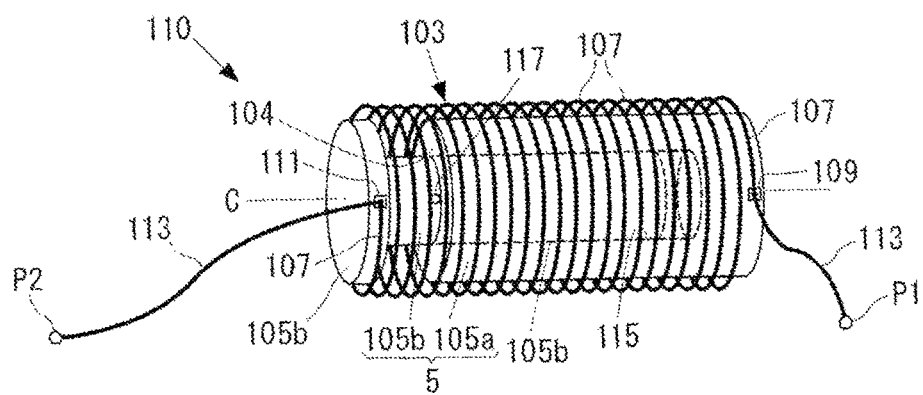
FIGS. 9A and 9B illustrate Configuration Example 1 of an inductance-changing mechanism according to a sixth embodiment of the disclosure.
Figure 9B:
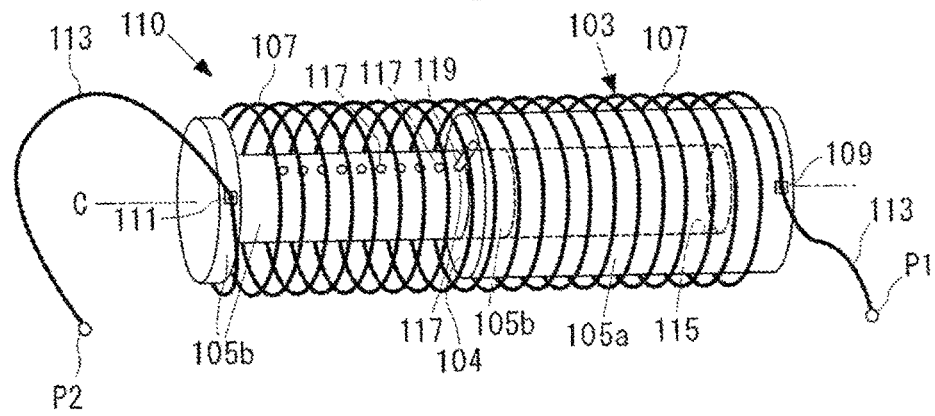

FIG. 9 illustrates a coil support body 105 according to Configuration Example 1. In Configuration Example 1, the coil support body 105 has one end portion and the other end portion in a direction of a winding axis C. The one end portion includes a first fixing portion 109 to which a portion of a conductive wire 107 corresponding to one end portion of a coil 103 is fixed, and the other end portion includes a second fixing portion 111 to which another portion of the conductive wire 107 corresponding to the other end portion of the coil 103 is fixed. The coil support body 105 is extensible and contractible in the direction of the winding axis C. In this way, the mutual relative positions of the first and second fixing portions 109 and 111 are changed, and thus the shape of the coil 103 is changed.

In Configuration Example 1, the coil support body 105 is extensible and contractible by the following configuration.

The coil support body 105 has first and second coil support portions 105a and 105b. A hole 115 formed in the first coil support portion 105a. The hole 115 extends in the direction of the winding axis C, and is opened to an end surface 104 of the first coil support portion 105a in the direction of the winding axis C. The second coil support portion 105b is inserted into the hole 115 such that the second coil support portion 105b is movable with respect to the first coil support portion 105a in the direction of the winding axis C. It is possible to change a length in which the second coil support portion 105b extrudes from the end surface 104 in the direction of the winding axis C. That is, the coil support body 105 is extensible and contractible.

The first coil support portion 105a includes the first fixing portion 109. The first fixing portion 109 is located at a constant position in the first coil support portion 105a regardless of the amount of extension or contraction of the coil support body 105. The second coil support portion 105b includes the second fixing portion 111. The second fixing portion 111 is located at a constant position in the second coil support portion 105b regardless of the amount of extension or contraction of the coil support body 105.

For example, the conductive wire 107 that forms the coil 103 is made of an elastic body. That is, the coil 103 is a conductive coil spring. Hereinafter, the coil 103 is not a conductive coil spring when the coil 103 is not described as a conductive coil spring.

In Configuration Example 1, when the coil 103 is a conductive coil spring, and when the coil support body 105 is extended from a state of FIG. 9A (e.g., is in a state of FIG.

9B), an elastic restoring force that attempts to restore the shape of the coil 103 to the state of FIG. 9A is generated in the coil 103. This restoring force attempts to restore an extended or contracted state of the coil support body 105 to the state of FIG. 9A by acting on the coil support body 105 through the first and second fixing portions 109 and 111. For this reason, for example, a maintenance mechanism is provided to maintain the amount of extension when the coil support body 105 is extended from the state of FIG. 9A by hand work of a person (that is, when the second coil support portion 105*b* is extended from the end surface 104 of the first coil support portion 105*a* from the state of FIG. 9A). In the example of FIG. 9, a plurality of holes 117 is open at intervals in the direction of the winding axis C on an outer circumference surface of the second coil support portion 105*b*, and a portion of a pin 119 extruding outward from one of the holes 117 is engaged with the end surface 104 of the first coil support portion 105*a* when a person inserts the pin 119 into the hole 117. In this way, the amount of extension described above is maintained by resisting the restoring force described above. That is, the above-described maintenance mechanism includes the hole 117 and the pin 119.

The above-described maintenance mechanism may include components other than the hole 117 and the pin 119 described above. For example, the above-described maintenance mechanism may include a male screw formed on the outer circumference surface of the second coil support portion 105*b*, and a female screw formed on an inner circumference surface of the hole 115. That is, when the male screw and the female screw are screwed with each other, the extension amount of the second coil support portion 105*b* extended from the end surface 104 of the first coil support portion 105*a* is maintained. In addition, when a person rotates the second coil support portion 105*b* around the winding axis C, the extension amount of the second coil support portion 105*b* extended from the end surface 104 of the first coil support portion 105*a* is changed. In this instance, when the other end portion of the coil 103 is removed from the second fixing portion 111, and the second coil support portion 105*b* is rotated around the winding axis C to change the extension amount of the second coil support portion 105*b* from the end surface 104, the other end portion of the coil 103 is fixed to the second fixing portion 111 again.

In addition, in Configuration Example 1, in a case in which the coil 103 is a conductive coil spring, the coil 103 is supported by the coil support body 105 when one end portion of the coil spring is fixed to the first fixing portion 109, and the other end portion of the coil spring is fixed to the second fixing portion 111.

In Configuration Example 1, in a case in which the coil 103 is not a conductive coil spring, the above description is similarly applied except for a point described below. The means (hole 117) for maintaining the extended state of the coil support body 105 is omitted. Instead, to maintain the extended or contracted state of the coil support body 105, a female screw is formed on an inner surface of the hole 115, and a male screw is formed on the outer circumference surface of the second coil support portion 105*b*. Therefore, the male screw on the outer circumference surface of the second coil support portion 105*b* is screwed with the female screw on the inner circumference surface of the hole 115 in the first coil support portion 105*a*. In this configuration, a length in which the second coil support portion 105*b* is extended from the end surface 104 in the direction of the winding axis C may be changed when a person rotates the second coil support portion 105*b* with respect to the first coil support portion 105*a*. That is, the coil support body 105 is extensible and contractible. In this way, the mutual relative positions of the first and second fixing portions 109 and 111 are changeable.

In addition, in the case in which the coil 103 is not a conductive coil spring, a description below is applied when the amount of extension or contraction of the coil support body 105 is changed. First, the one end portion or the other end portion of the coil 103 is removed from the first or second fixing portion 109 or 111 to unwind the conductive wire 107 from the outer circumference surface of the coil support body 105. Subsequently, the amount of extension or contraction of the coil support body 105 is changed. Thereafter, the conductive wire 107 is rewound around the outer circumference surface of the coil support body 105 (the first and second coil support portions 105*a* and 105*b*). Then, the one end portion or the other end portion of the coil 103 is fixed to the first or second fixing portion 109 or 111 again. The above-described series of operations is performed by a person.

In Configuration Example 1, in the case in which the coil 103 is not a conductive coil spring, for example, the coil 103 is supported by the coil support body 105 when the conductive wire 107 is wound around the outer circumference surface of the coil support body 105 unlike FIG. 9. In this case, other points may be the same as the above description.

FIG. 10 illustrates an example of the case in which the coil 103 is not a conductive coil spring in Configuration Example 1. In FIG. 10, the coil support body 105 has a first coil support portion 105*a*, a second coil support portion 105*b*, and a middle coil support portion 108.

Each of the first coil support portion 105*a*, the second coil support portion 105*b*, and the middle coil support portion 108 has an outer circumference surface around which the coil 103 may be wound. Each of the first coil support portion 105*a*, the second coil support portion 105*b*, and the middle coil support portion 108 may preferably have a cylindrical shape or a prismatic shape in which the winding axis C is set as an axis.

A hollow hole 122 is formed in the first coil support portion 105*a* in the direction of the winding axis C. The hollow hole 122 is opened to one end surface of the first coil support portion 105*a* in the direction of the winding axis C. In the example of FIG. 10, the hollow hole 122 penetrates through the first coil support portion 105*a* in the direction of the winding axis C. As in FIG. 10A, the middle coil support portion 108 is accommodated in the hollow hole 122.

A hollow hole 124 is formed in the middle coil support portion 108 in the direction of the winding axis C. The hollow hole 124 is opened to one end surface of the middle coil support portion 108 in the direction of the winding axis C. In the example of FIG. 10, the hollow hole 124 penetrates through the middle coil support portion 108 in the direction of the winding axis C. As in FIG. 10A, the second coil support portion 105*b* is accommodated in the hollow hole 124.

In FIG. 10A, the coil support body 105 is contracted as a whole in the direction of the winding axis C. For example, the middle coil support portion 108 may be allowed to protrude in the direction of the winding axis C from the one end surface of the first coil support portion 105*a* in the direction of the winding axis C, and the second coil support portion 105*b* may be allowed to protrude in the direction of the winding axis C from the one end surface of the middle coil support portion 108 in the direction of the winding axis C using a hand of a person such that a state of FIG. 10A is changed to a state of FIG. 10B. In this way, the coil support body 105 is extended.

In the state in which the coil support body 105 is extended as described above, in an example of FIG. 10B, a bracket 126, which is fixed to the other end surface of the middle coil support portion 108, is fixed to an inner circumference surface of the first coil support portion 105a that forms the hollow hole 122 using an adhesive, an adhesive tape, a screw, etc. (in this example, a screw 128). In this way, the middle coil support portion 108 is fixed to the first coil support portion 105a. The second coil support portion 105b is fixed to the middle coil support portion 108 using a similar means.

In the example of FIG. 10, when the amount of extension or contraction of the coil support body 105 is changed, a description below is applied. First, the one end portion or the other end portion of the coil 103 is removed from the first or second fixing portion 109 or 111 (e.g., from a state of FIG. 10A) to unwind the conductive wire 107 from the coil support body 105. Subsequently, the amount of extension or contraction of the coil support body 105 is changed. Thereafter, as in FIG. 10B, the conductive wire 107 is rewound around the outer circumference surface of the coil support body 105 (the first coil support portion 105a, the second coil support portion 105b, and the middle coil support portion 108), and the one end portion or the other end portion of the coil 103 is fixed to the first or second fixing portion 109 or 111. The above-described series of operations may be performed by a person.

The middle coil support portion 108 may be extensible and contractible in the direction of the winding axis C. In this case, the middle coil support portion may be configured to be extensible and contractible using the same means as the above means or another means. In addition, in this case, other points may be the same as the above description.

(Configuration Example 2)

Figure 11A:
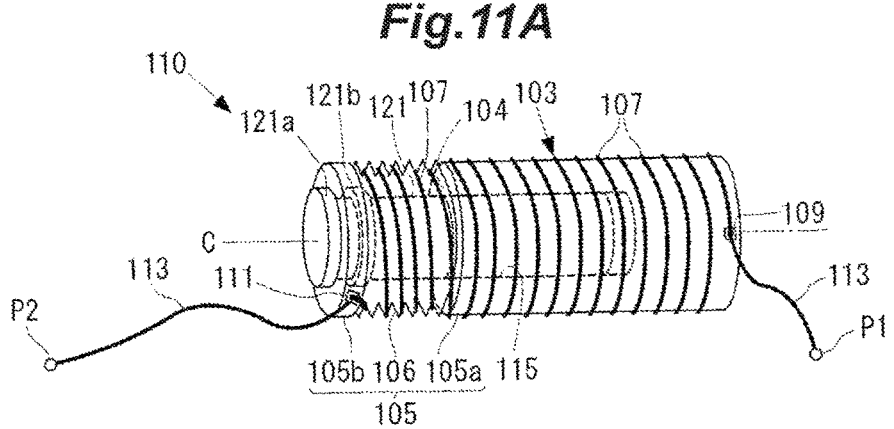
FIGS. 11A and 11B illustrate Configuration Example 2 of the inductance-changing mechanism according to the sixth embodiment of the disclosure.
Figure 11B:
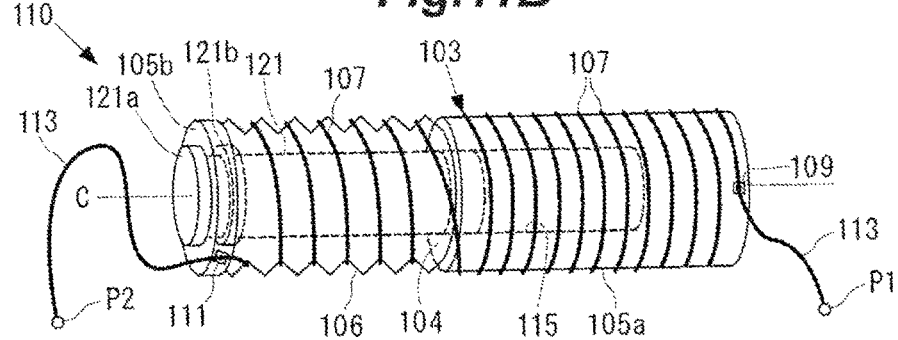

FIG. 11 illustrates a coil support body 105 according to Configuration Example 2. In Configuration Example 2, the coil support body 105 has one end portion and the other end portion in a direction of a winding axis C similarly to Configuration Example 1. The one end portion includes a first fixing portion 109 to which a portion of a conductive wire 107 corresponding to one end portion of a coil 103 is fixed, and the other end portion includes a second fixing portion 111 to which another portion of the conductive wire 107 corresponding to the other end portion of the coil 103 is fixed. The coil support body 105 is extensible and contractible in the direction of the winding axis C. In this way, mutual relative positions of the first and second fixing portions 109 and 111 are changed, and thus a shape of the coil 103 is changed.

In Configuration Example 2, the coil support body 105 is extensible and contractible by the following configuration.

The coil support body 105 has a bellows portion 106 in a middle portion in the direction of the winding axis C. In addition, the coil support body 105 has a first coil support portion 105a on one end side in the direction of the winding axis C, and a second coil support portion 105b on the other end side in the direction of the winding axis C. One end portion of the bellows portion 106 in the direction of the winding axis C is coupled to the first coil support portion 105a. The other end portion of the bellows portion 106 in the direction of the winding axis C is coupled to the second coil support portion 105b.

The first coil support portion 105a includes the first fixing portion 109. The first fixing portion 109 is located at a constant position in the first coil support portion 105a regardless of the amount of extension or contraction of the coil support body 105. The second coil support portion 105b includes the second fixing portion 111. The second fixing portion 111 is located at a constant position in the second coil support portion 105b regardless of the amount of extension or contraction of the coil support body 105.

The coil support body 105 further has a connecting portion 121 that connects the first and second coil support portions 105a and 105b to each other. The connecting portion 121 is positioned inside the bellows portion 106, and a male screw is formed on an outer circumference surface of one end-side portion of the connecting portion 121. The one end-side portion of the connecting portion 121 is inserted into a hole 115 of the first coil support portion 105a. The hole 115 is opened to an end surface 104 of the first coil support portion 105a in the direction of the winding axis C, and extends in the direction of the winding axis C. In addition, a female screw is formed on an inner circumference surface of the hole 115. The male screw in the one end-side portion of the connecting portion 121 is screwed with the female screw on the inner circumference surface of the hole 115 in the first coil support portion 105a. The other end-side portion of the connecting portion 121 is connected to the second coil support portion 105b in the direction of the winding axis C such that the other end-side portion is rotatable around the winding axis C with respect to the second coil support portion 105b. For this reason, in FIG. 11, the connecting portion 121 has a pair of diameter-enlarged portions 121a and 121b penetrating through the second coil support portion 105b to put the second coil support portion 105b therebetween in the direction of the winding axis C.

In this configuration, when a person rotates the connecting portion 121 around the winding axis C with respect to the first coil support portion 105a, the bellows portion 106 is extended or contracted in the direction of the winding axis C without the bellows portion 106 being twisted. That is, the coil support body 105 is extended or contracted. In this way, mutual relative positions of the first and second fixing portions 109 and 111 are changeable.

The conductive wire 107 is wound around an outer circumference surface of the bellows portion 106. The conductive wire 107 is further wound around an outer circumference surface of one of or both the first and second coil support portions 105a and 105b (the first coil support portion 105a in FIG. 11).

When the amount of extension or contraction of the bellows portion 106 is changed, a description below is applied. First, the one end portion or the other end portion of the coil 103 is removed from the first or second fixing portion 109 or 111 (e.g., from a state of FIG. 11A) to unwind the conductive wire 107 from the bellows portion 106. Subsequently, the amount of extension or contraction of the bellows portion 106 is changed. Thereafter, the conductive wire 107 is rewound around the outer circumference surface of the bellows portion 106, and the one end portion or the other end portion of the coil 103 is fixed to the first or second fixing portion 109 or 111. When the conductive wire 107 is further wound around the outer circumference surface of one of or both the first and second coil support portions 105a and 105b, and when the amount of extension or contraction of the bellows portion 106 is changed, the conductive wire 107 is unwound from the bellows portion 106 from the outer circumference surface to change the amount of extension or contraction of the bellows portion 106, and then the conductive wire 107 is rewound around the outer circumference surface to fix the one end portion or the other end portion of the coil 103 to the first or second fixing portion 109 or 111. The above-described series of operations may be performed by a person.

In Configuration Example 2, the coil 103 is supported by the coil support body 105 when the conductive wire 107 is wound around the outer circumference surface of the bellows portion 106 or wound around the outer circumference surface of the bellows portion 106 and the outer circumference surface of one of or both the first and second coil support portions 105a and 105b.

(Configuration Example 3)

FIG. 12 illustrates a coil support body 105 according to Configuration Example 3. In Configuration Example 3, mutual relative positions of first and second fixing portions 109 and 111 may be changed by the following configuration.

The coil support body 105 has first and second coil support portions 105a and 105b.

The first coil support portion 105a includes the first fixing portion 109 to which a portion of a conductive wire 107 corresponding to one end portion of a coil 3 is fixed. The first fixing portion 109 is located at a constant position in the first coil support portion 105a. The second coil support portion 105b includes the second fixing portion 111 to which another portion of the conductive wire 107 corresponding to the other end portion of the coil 3 is fixed. The second fixing portion 111 is located at a constant position in the second coil support portion 105b. The second fixing portion 111 is located at a distal end portion of the second coil support portion 105b in a direction of a winding axis C.

A hole 115 is formed in the first coil support portion 105a. The hole 115 extends in the direction of the winding axis C, and is opened to an end surface 104 of the first coil support portion 105a in the direction of the winding axis C. The second coil support portion 105b is inserted into the hole 115 such that the second coil support portion 105b is movable with respect to the first coil support portion 105a in the direction of the winding axis C. The second coil support portion 105b may be extended from the end surface 104 in the direction of the winding axis C by a variable length. In this way, the mutual relative positions of first and second fixing portions 109 and 111 may be changed.

In Configuration Example 3, the coil 103 is a conductive coil spring. The conductive wire 107, which forms the coil 103, gradually extends to transfer to an inside in a radial direction with respect to the winding axis C while turning around the winding axis C from the first fixing portion 109 to the second fixing portion 111. The radial direction is a direction orthogonal to the winding axis C (and so forth).

Figure 12A:
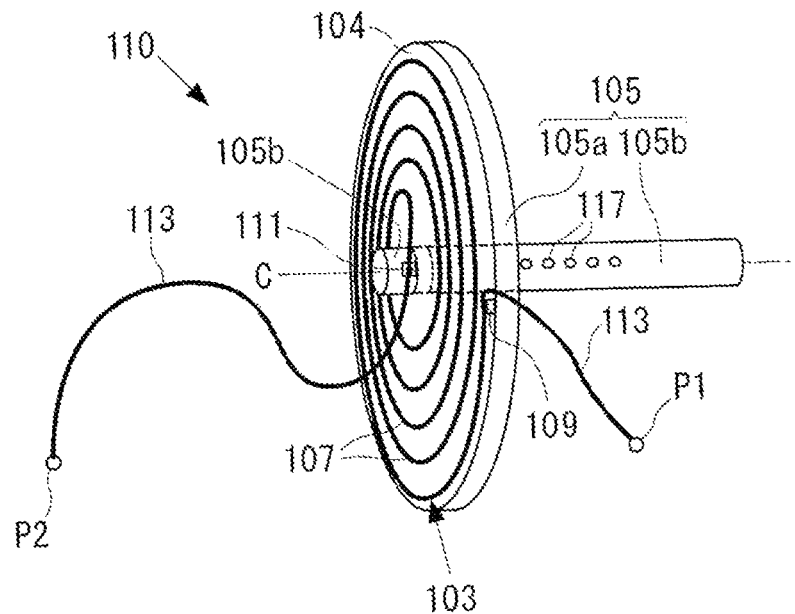
FIGS. 12A and 12B illustrate Configuration Example 3 of the inductance-changing mechanism according to the sixth embodiment of the disclosure.
Figure 12B:
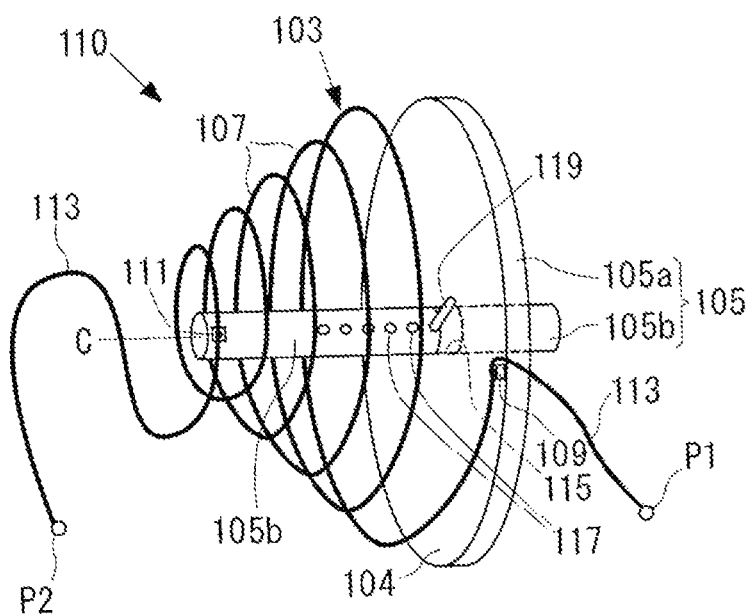

In a state of FIG. 12A, any elastic restoring force is not generated in the coil spring 103. When the second coil support portion 105b extends from the end surface 104 of the first coil support portion 105a in the direction of the winding axis C from the state of FIG. 12A by an increased amount (e.g., when the second coil support portion 105b is changed to a state of FIG. 12B), an elastic restoring force, which attempts to restore a shape of the coil spring 103 to the state of FIG. 12A, is generated in the coil spring 103. This restoring force attempts to restore a state of the coil support body 105 to the state of FIG. 12A by acting on the coil support body 105 through the first and second fixing portions 109 and 111. For this reason, a maintenance mechanism is provided to maintain the amount at which the second coil support portion 105b extends from the end surface 104 of the first coil support portion 105a. In an example of FIG. 12, a plurality of holes 117 is opened at intervals in the direction of the winding axis C on an outer circumference surface of the second coil support portion 105b. When a person inserts a pin 119 into any one of the holes 117, a portion of the pin 119 protruding outward from the hole 117 is engaged with the end surface 104 of the first coil support portion 105a. In this way, the amount at which the second coil support portion 105b extends from the end surface 104 of the first coil support portion 105a is maintained by resisting the above-described elastic restoring force. That is, the above-described maintenance mechanism includes the holes 117 and the pin 119.

The above-described maintenance mechanism may include components other than the holes 117 and the pin 119 described above. For example, the above-described maintenance mechanism may include a male screw formed on the outer circumference surface of the second coil support portion 105b, and a female screw formed on an inner circumference surface of the hole 115. That is, when the male screw and the female screw are screwed to each other, the amount at which the second coil support portion 105b extends from the end surface 104 of the first coil support portion 105a is maintained. In addition, when a person rotates the second coil support portion 105b around the winding axis C, the amount at which the second coil support portion 105b extends from the end surface 104 of the first coil support portion 105a is changed. In this instance, when the other end portion of the coil 103 is removed from the second fixing portion 111, and the second coil support portion 105b is rotated around the winding axis C to change the extension amount of the second coil support portion 105b from the end surface 104, the other end portion of the coil 103 is fixed to the second fixing portion 111 again.

As an example, in a state in which any elastic restoring force is not generated in the coil spring 103 (the state of FIG. 12A), the whole coil 103 is positioned on the same virtual plane. In addition, in the example of FIG. 12, the hole 115 penetrates through the first coil support portion 105a, and the second coil support portion 105b penetrates through the hole 115 (see FIG. 12B).

In Configuration Example 3, when the one end portion of the coil 103 is fixed to the first fixing portion 109, and the other end portion of the coil 103 is fixed to the second fixing portion 111, the coil 103 is supported by the coil support body 105.

(Configuration Example 4)

FIG. 13 illustrates a coil support body 105 according to Configuration Example 4. In Configuration Example 4, mutual relative positions of first and second fixing portions 109 and 111 are changeable as below.

The coil support body 105 includes first and second coil support portions 105a and 105b. The first and second coil support portions 105a and 105b have slide surfaces 112 and 114, respectively. The slide surface 112 of the first coil support portion 105a comes into contact with the slide surface 114 of the second coil support portion 105b. In this state, the first and second coil support portions 105a and 105b are movable with respect to each other along the slide surfaces 112 and 114. In this way, the mutual relative positions of the first and second fixing portions 109 and 111 are changeable.

In Configuration Example 4, the slide surfaces 112 and 114 may be flat surfaces, curved surfaces, or combinations of flat surfaces and curved surfaces when the slide surfaces 112 and 114 have shapes matching each other, and may slide while touching each other along the slide surfaces 112 and 114. In addition, in a state of FIG. 13A, the first and second coil support portions 105a and 105b have one cylindrical shape or prismatic shape as a whole.

The first coil support portion 105a includes the first fixing portion 109 to which a portion of a conductive wire 107 corresponding to one end portion of a coil 103 is fixed. The first fixing portion 109 is located at a constant position in the first coil support portion 105a (in FIG. 13, an end portion in a direction of a winding axis C). The second coil support portion 105b includes the second fixing portion 111 to which another portion of the conductive wire 107 corresponding to the other end portion of the coil 103 is fixed. The second fixing portion 111 is located at a constant position in the second coil support portion 105b (in FIG. 13, an end portion in the direction of the winding axis C).

Figure 13A:
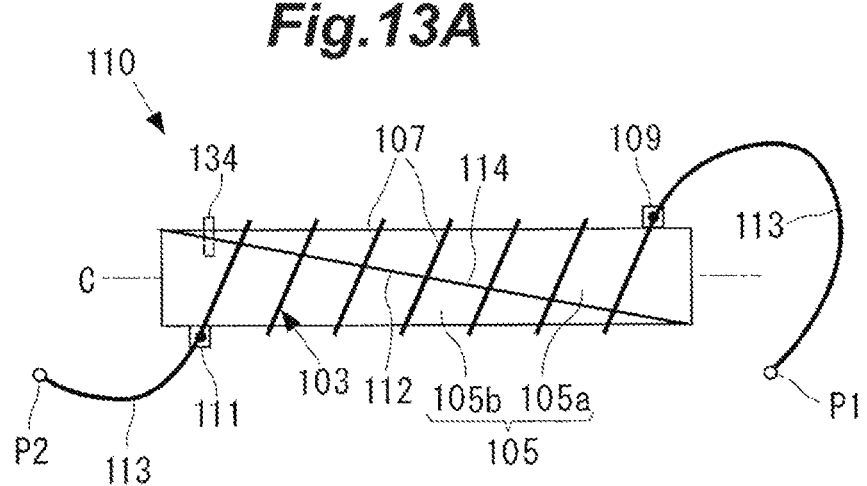
FIGS. 13A and 13B illustrate Configuration Example 4 of the inductance-changing mechanism according to the sixth embodiment of the disclosure.
Figure 13B:
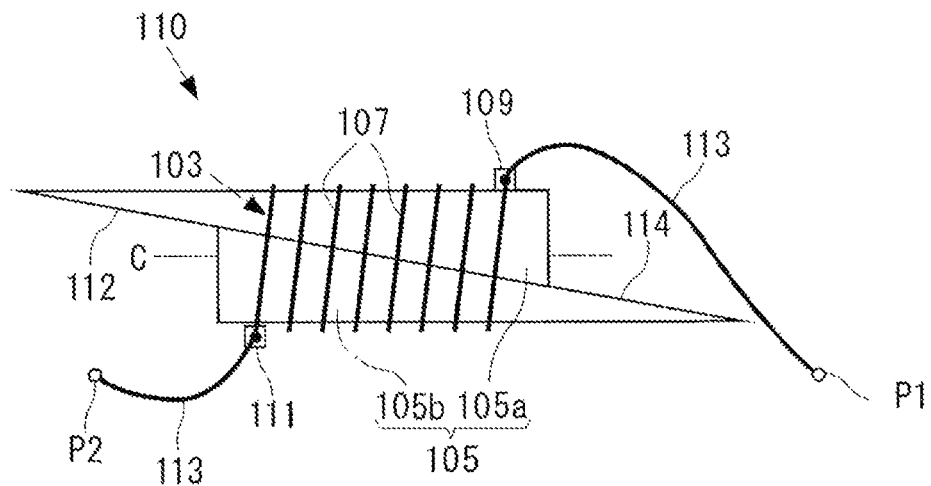

In FIG. 13, a direction in which the first and second coil support portions 105a and 105b move with respect to each other along the slide surfaces 112 and 114 is inclined with respect to the winding axis C. Therefore, when the first and second coil support portions 105a and 105b move with respect to each other along the slide surfaces 112 and 114 from the state of FIG. 13A to a state of FIG. 13B or from the state of FIG. 13B to the state of FIG. 13A, a distance between the first and second fixing portions 109 and 111 is changed not only in the direction of the winding axis C but also in a direction orthogonal to the direction of the winding axis C.

For example, when the first and second coil support portions 105a and 105b are moved with respect to each other along the slide surfaces 112 and 114 from the state of FIG. 13A to a state of FIG. 13B, it is preferable to fix the first and second coil support portions 105a and 105b to each other using an appropriate means. For example, the first and second coil support portions 105a and 105b may be fixed to each other as in FIGS. 14A to 14C.

Figure 14A:
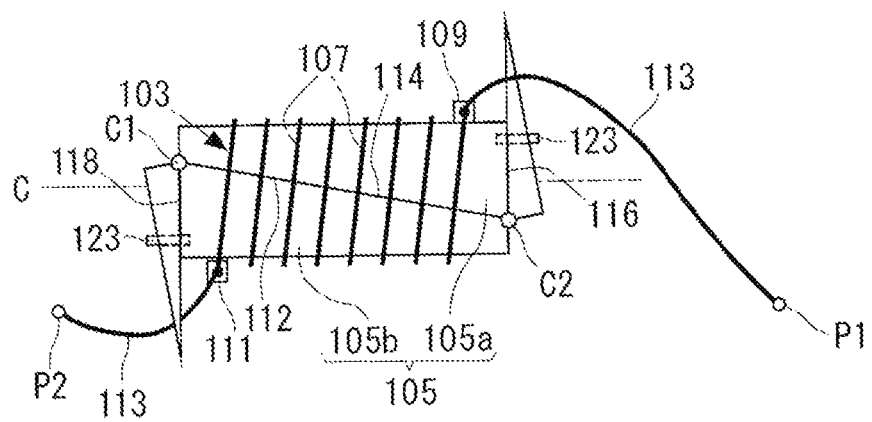
FIGS. 14A to 14C illustrate a means for fixing first and second coil support portions to each other in Configuration Example 4 of the sixth embodiment.

In an example of FIG. 14A, the first coil support portion 105a is bendable around a rotation axis C1. A portion bent in this way is brought into contact with an end surface 118 of the second coil support portion 105b, and is fixed to the second coil support portion 105b using a fixing means 123 (a bolt or a screw). Similarly, the second coil support portion 105b is bendable around a rotation axis C2. A portion bent in this way is brought into contact with an end surface 116 of the first coil support portion 105a, and is fixed to the first coil support portion 105a using the fixing means 123 (the bolt or the screw). In this way, the first and second coil support portions 105a and 105b are fixed to each other.

Figure 14B:
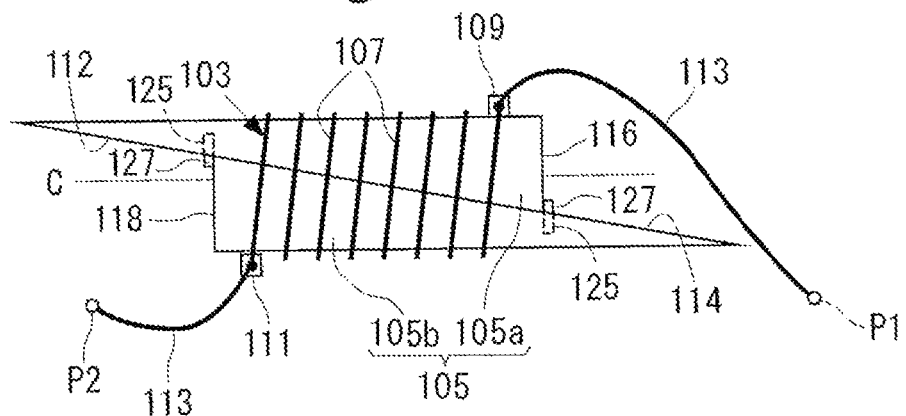

In an example of FIG. 14B, engaged members 127 (a pin, a wedge-shaped member, a bolt, a screw, a pawl, etc.) are inserted into holes 125 opened to the slide surfaces 112 and 114 of the first and second coil support portions 105a and 105b. The engaged members 127 are engaged with the end surfaces 116 and 118 of the first and second coil support portions 105a and 105b, respectively. In this way, the first and second coil support portions 105a and 105b are fixed to each other.

Figure 14C:
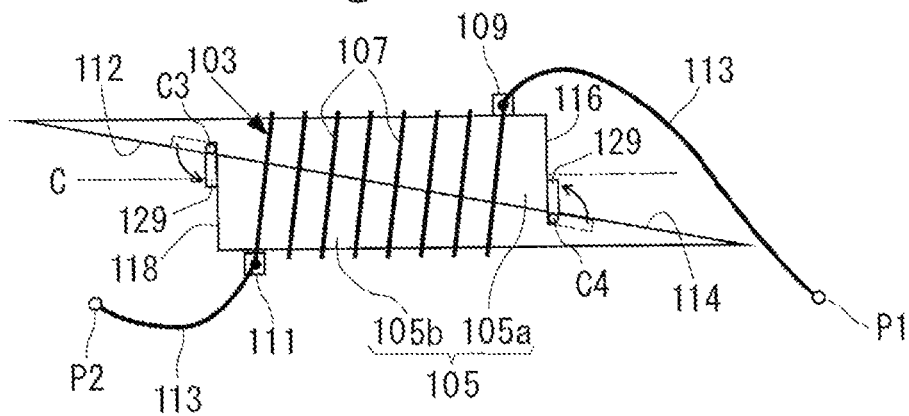

In an example of FIG. 14C, an engaged member 129 provided in the first coil support portion 105a rises from a state indicated by a thin dot-and-dash line of FIG. 14C around a rotation axis C3 due to an elastic force of an appropriate spring (not illustrated), and is engaged with the end surface 118 of the second coil support portion 105b. Similarly, an engaged member 129 provided in the second coil support portion 105b rises from a state indicated by a thin dot-and-dash line of FIG. 14C around a rotation axis C4 due to an elastic force of an appropriate spring (not illustrated), and is engaged with the end surface 116 of the first coil support portion 105a. In this way, the first and second coil support portions 105a and 105b are fixed to each other.

Meanwhile, referring to FIG. 13A, the state of FIG. 13A may be maintained by fixing the first and second coil support portions 105a and 105b to each other using a screw, a bolt and a nut, or an adhesive (In an example of the figure, a screw 134).

In Configuration Example 4, the coil 103 is supported by the coil support body 105 when the conductive wire 107 is wound around an outer circumference surface of the coil support body 105.

In addition, when relative positions of the first and second fixing portions 109 and 111 are changed, a description below is preferably applied. First, the one end portion or the other end portion of the coil 103 is removed from the first or second fixing portion 109 or 111 to unwind the conductive wire 107 from the outer circumference surface of the coil support body 105. Subsequently, the first and second coil support portions 105a and 105b are moved with respect to each other along the slide surfaces 112 and 114. Thereafter, the conductive wire 107 is rewound on the outer circumference surface, and the one end portion or the other end portion of the coil 103 is fixed to the first and second fixing portions 109 and 111. The above-described series of operations may be performed by a person.

(Configuration Example 5)

Figure 15A:
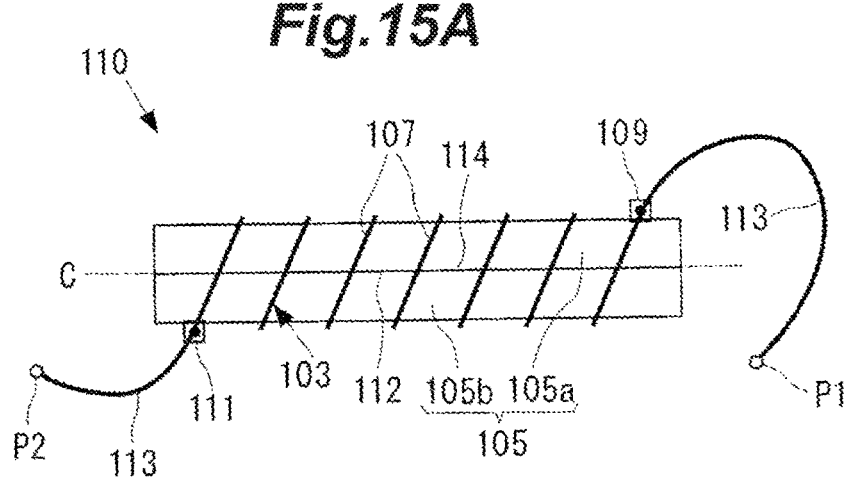
FIGS. 15A and 15B illustrate Configuration Example 5 of the inductance-changing mechanism according to the sixth embodiment of the disclosure.
Figure 15B:
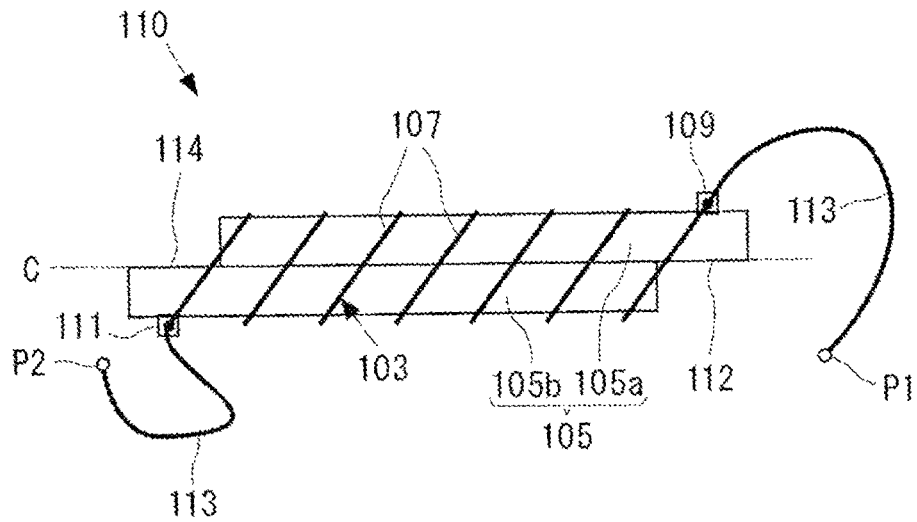

FIG. 15 illustrates a coil support body 105 according to Configuration Example 5. Configuration Example 5 is different from Configuration Example 4 in the following point. In Configuration Example 5, a direction in which first and second coil support portions 105a and 105b move with respect to each other along slid surfaces 112 and 114 is a direction of a winding axis C. Other points in Configuration Example 5 are the same as those in Configuration Example 4.

[Seventh Embodiment]

FIGS. 16 to 20 illustrate Configuration Examples 1 to 4 of an inductance-changing mechanism 110 according to a seventh embodiment of the disclosure. Similarly to the sixth embodiment, the inductance-changing mechanism 110 according to the seventh embodiment is a component for changing an inductance of a coil 103 included in an electric circuit. When an inductance is changed, for example, it is possible to adjust a current flowing through the electric circuit or a voltage generated inside the electric circuit to be less than or equal to a threshold value, or to increase power transmission efficiency in the electric circuit for power transmission. For example, the electric circuit is the above-described wireless power transfer circuit or wireless power reception circuit. However, other electric circuits may be used.

The inductance-changing mechanism 110 includes a coil support body 105 that supports the coil 103. The coil 103 is formed by a conductive wire 107 that extends to turn around a winding axis C of the coil support body 105. An outer surface of the conductive wire 107 is not illustrated. The outer surface is preferably covered with an insulating film.

According to the seventh embodiment, the coil support body 105 includes a plurality of types of fixing portions (described below) for fixing the conductive wire 107. A fixing portion used to fix the conductive wire 107 may be changed among the plurality of types of fixing portions. That is, it is possible to switch between one state in which the conductive wire 107 is fixed by any one of the plurality of types of fixing portions, and another state in which the conductive wire 107 is fixed by another type of fixing portion. In this way, a shape of the coil 103 is changed. As a result, an inductance of the coil 103 is changed. In this way, a desired inductance is achieved.

In the electric circuit, one end portion and the other end portion of the coil 103 are electrically connected to other places P1 and P2 of the electric circuit which includes the coil 103 through a conductive wire for connection 113.

The above description corresponds to Configuration Examples 1 to 4 illustrated in FIG. 16 to FIG. 20. Hereinafter, Configuration Examples 1 to 4 will be successively described in detail.

(Configuration Example 1)

Figure 16A:
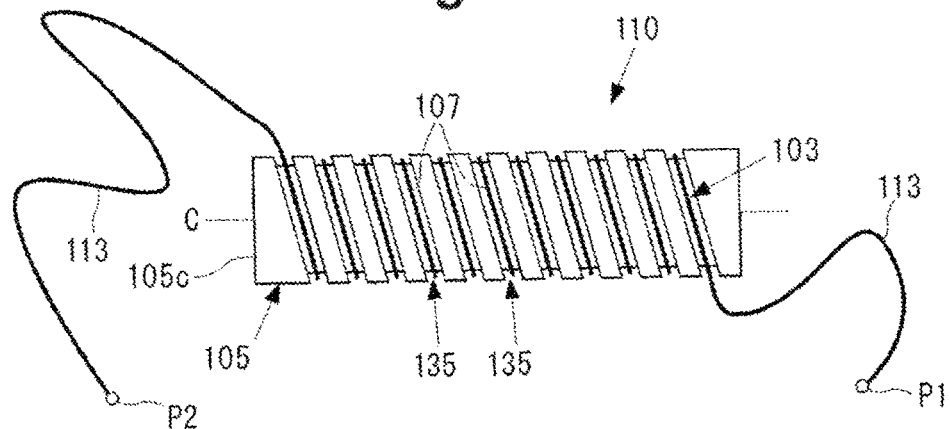
FIGS. 16A and 16B illustrate Configuration Example 1 of an inductance-changing mechanism according to a seventh embodiment of the disclosure.
Figure 16B:
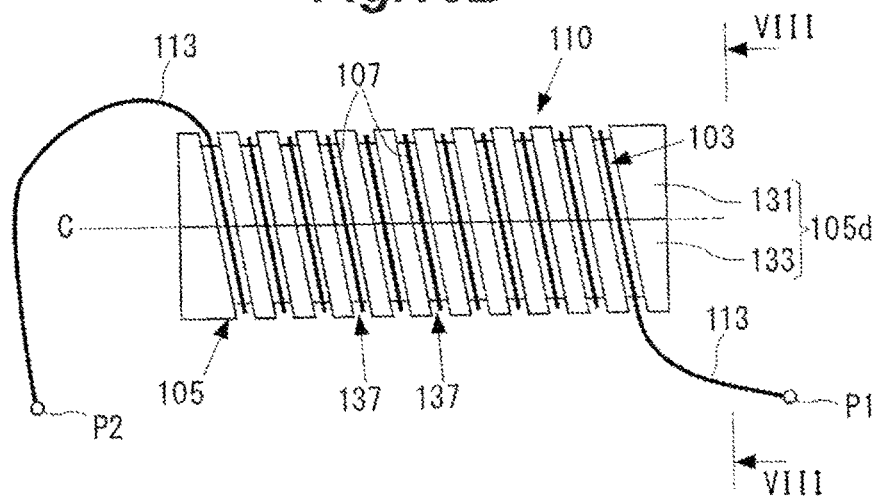
Figure 17A:
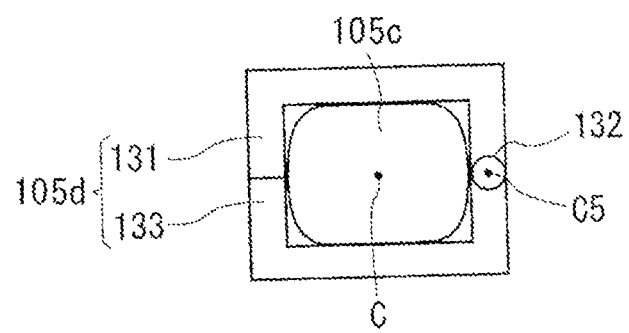
FIGS. 17A and 17B are diagrams for descriptions of attaching and detaching of a cover member to and from a central member in Configuration Example 1 of the seventh embodiment.
Figure 17B:
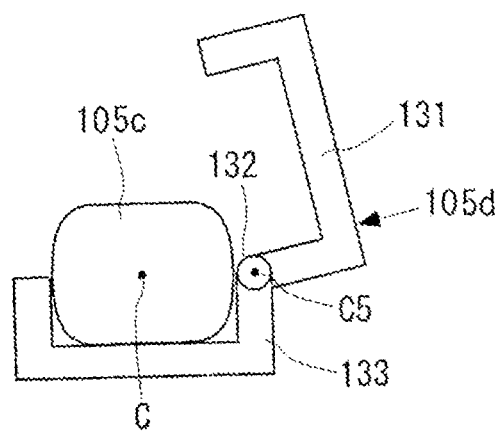

FIG. 16 illustrates a coil support body 105 according to Configuration Example 1. In Configuration Example 1 of FIG. 16, a fixing portion used to fix a conductive wire 107 may be changed among a plurality of types of fixing portions according to a configuration below. FIG. 17A is diagram taken along VIII-VIII line of FIG. 16B.

The coil support body 105 includes a central member 105c having an outer circumference surface that extends in a circumferential direction around a winding axis C, and a cover member 105d attachable to the central member 105c (see FIG. 16B and FIG. 17). The central member 105c has a magnetic core therein, or is made of a magnetic material. The cover member 105d is attachable and detachable to and from the central member 105c.

As illustrated in FIG. 16B and FIG. 17, the cover member 105d includes first and second cover portions 131 and 133. The first and second cover portions 131 and 133 are connected to each other such that the first and second cover portions 131 and 133 are rotatable with respect to each other around a rotation axis C5 that extends in a direction of the winding axis C. For example, the first and second cover portions 131 and 133 are connected to each other through a hinge 132, and are rotatable with respect to each other around the rotation axis C5 of the hinge 312.

The cover member 105d is attached to and detached from the central member 105c as below. The first and second cover portions 131 and 133 are opened around the rotation axis C5 as in FIG. 17B to put the central member 105c inside between the first and second cover portions 131 and 133, and the first and second cover portions 131 and 133 are closed around the rotation axis C5. In this way, the cover member 105d is attached to the central member 105c. In addition, the cover member 105d may be detached from the central member 105c in reverse order.

FIG. 16A illustrates a state in which the cover member 105d is not attached to the outer circumference surface of the central member 105c, and FIG. 16B illustrates a state in which the cover member 105d is attached to the outer circumference surface of the central member 105c. In the state in which the cover member 105d is attached to the central member 105c, the cover member 105d covers the outer circumference surface of the central member 105c. In the state in which the cover member 105d is not attached to the central member 105c, the conductive wire 107 may be wound around the outer circumference surface of the central member 105c. In the state in which the cover member 105d is attached to the central member 105c, the conductive wire 107 may be wound around an outer circumference surface of the cover member 105d. A cross-sectional area of a coil 103 of FIG. 16A is smaller than a cross-sectional area of a coil of FIG. 16B.

First and second grooves 135 and 137 for disposing the conductive wire 107 are provided as the above-described plurality of types of fixing portions on the outer circumference surface of the central member 105c and the outer circumference surface of the cover member 105d, respectively. In addition, the first and second grooves 135 and 137 extend in a direction around the outer circumference surfaces of the central member 105c and the cover member 105d. The conductive wire 107 is fixed by being disposed in the first or second groove 135 or 137.

A groove for disposing the conductive wire 107 may be switched between the first groove 135 on the outer circumference surface of the central member 105c and the second groove 137 on the outer circumference surface of the cover member 105d attached to the central member 105c by attaching and detaching the cover member 105d to and from the central member 105c. That is, it is possible to switch between one state in which the conductive wire 107 is disposed in the first groove 135 on the outer circumference surface of the central member 105c and another state in which the conductive wire 107 is disposed in the second groove 137 on the outer circumference surface of the cover member 105d attached to the central member 105c. In this way, a fixing portion used to fix the conductive wire 107 may be changed among a plurality of types of fixing portions 135 and 137.

A conductive wire for connection 113, the conductive wire 107, and a conductive wire for connection 113 continuously extend in order from the place P1 to the place P2. In addition, the conductive wire for connection 113 connected to the place P1, the conductive wire 107, and the conductive wire for connection 113 connected to the place P2 form one wire. In the one wire, a wire portion (the conductive wire 107) wound around the outer circumference surface of the central member 105c or the cover member 105d forms the coil 103. Further, a length of the wire is set such that a groove in which the conductive wire 107 is disposed is switchable between the first groove 135 and the second groove 137.

In Configuration Example 1, the coil 103 is supported by the coil support body 105 when the coil 103 is disposed in the first or second groove 135 or 137.

(Configuration Example 2)

FIG. 18 illustrates a coil support body 105 according to Configuration Example 2. In Configuration Example 2 of FIG. 18, a fixing portion used to fix a conductive wire 107 may be changed among a plurality of types of fixing portions according to a configuration below.

A plurality of types of grooves 139 and 141 for disposing the conductive wire 107 is formed as the above-described plurality of types of fixing portions on an outer circumference surface of the coil support body 105. The grooves 139 and 141 extend in a direction of turning around the outer circumference surface of the coil support body 105. The conductive wire 107 is fixed by being disposed in the groove 139 or the groove 141.

Each of the grooves 139 and 141 is one groove that continuously extends in a spiral from one end portion of the coil support body 105 to the other end portion of the coil support body 105 while turning around a winding axis C. The number of turns of one type of spiral groove 139 around the winding axis C (that is, the number of turns of the coil 103 disposed in the groove 139) is different from the number of turns of another type of spiral groove 141 around the winding axis C (that is, the number of turns of the coil 103 disposed in the groove 141). For example, a pitch of the one type of spiral groove 139 is different from a pitch of the other type of spiral groove 141, or a length and an extending direction are different among a plurality types of grooves 139 and 141. In FIG. 18, the plurality types of grooves 139 and 141 intersect with each other at a plurality of places.

Figure 18A:
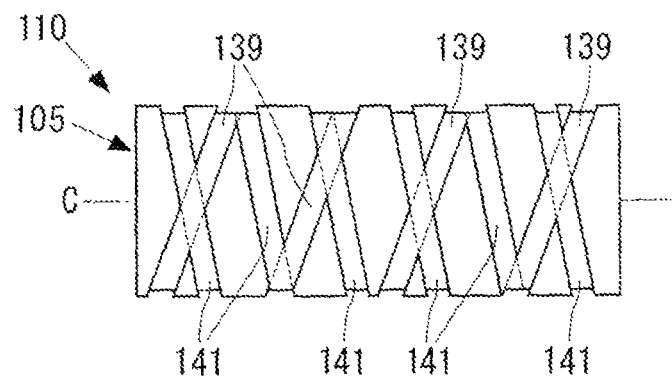
FIGS. 18A to 18C illustrate Configuration Example 2 of the inductance-changing mechanism according to the seventh embodiment of the disclosure.
Figure 18B:
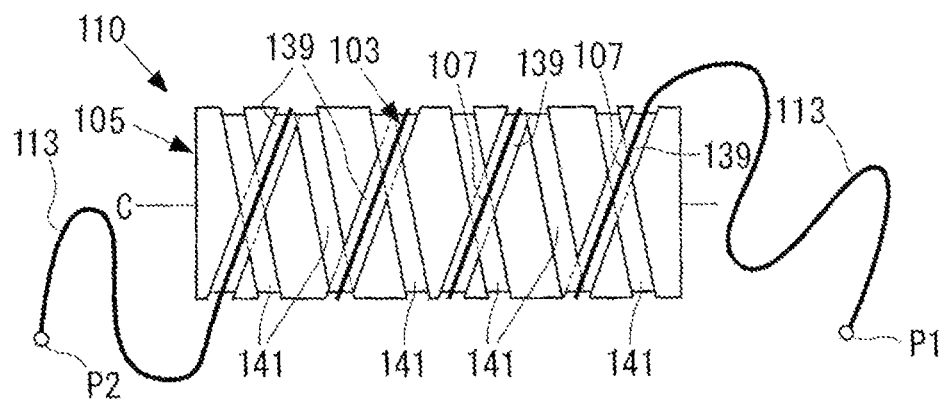
Figure 18C:
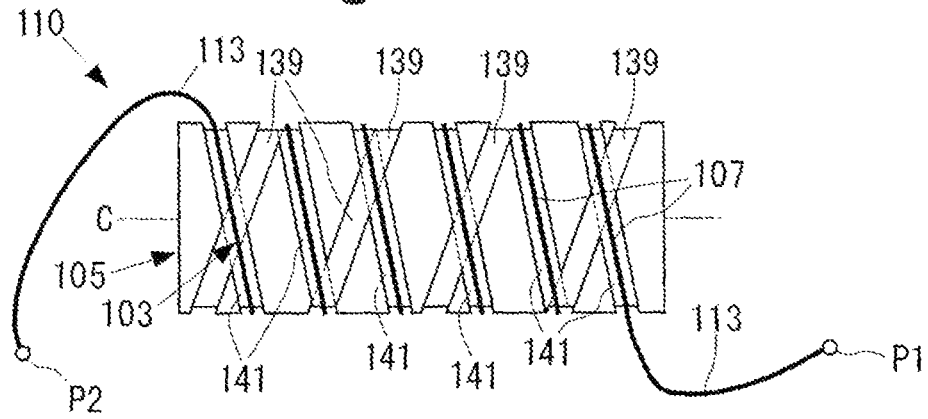

FIG. 18A illustrates a state in which the conductive wire 107 is not disposed in any one of the plurality types of grooves 139 and 141. FIG. 18B illustrates a state in which the conductive wire 107 is disposed in the groove 139. FIG. 18C illustrates a state in which the conductive wire 107 is disposed in the groove 141.

Each of the grooves 139 and 141 is a fixing portion for fixing the conductive wire 107 disposed in the groove. A groove in which the conductive wire 107 is disposed may be changed among the plurality types of grooves 139 and 141. That is, it is possible to switch between one state in which the conductive wire 107 is disposed in one type of groove 139 among the plurality types of grooves 139 and 141, and another state in which the conductive wire 107 is disposed in another type of groove 141. In this way, a fixing portion used to fix the conductive wire 107 may be changed among a plurality of types of fixing portions 139 and 141.

A conductive wire for connection 113, the conductive wire 107, and a conductive wire for connection 113 continuously extend in order from a place P1 to a place P2. In addition, the conductive wire for connection 113 connected to the place P1, the conductive wire 107, and the conductive wire for connection 113 connected to the place P2 form one wire. In the one wire, a wire portion (the conductive wire 107) disposed in any one of the plurality types of grooves 139 and 141 forms the coil 103. Further, a length of the wire is set such that a groove in which the conductive wire 107 is disposed is switchable between the groove 139 and the groove 141.

In Configuration Example 2, the coil 103 is supported by the coil support body 105 when the coil 103 is disposed in any one of the plurality types of grooves 139 and 141.

(Configuration Example 3)

FIG. 19 illustrates a coil support body 105 according to Configuration Example 3. In Configuration Example 3 of FIG. 19, a fixing portion used to fix a conductive wire 107 may be changed among a plurality of types of fixing portions according to a configuration below. The coil support body 105 may have a cylindrical shape or a prismatic shape.

Figure 19A:
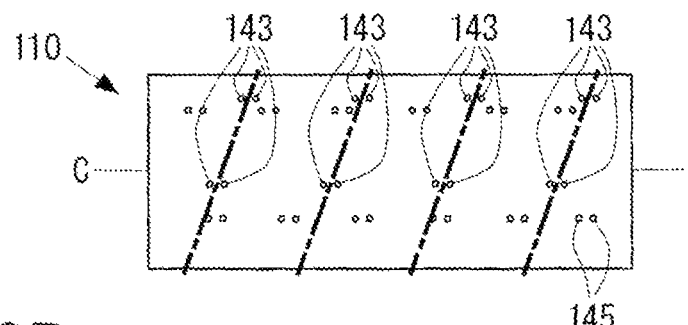
FIGS. 19A to 19D illustrate Configuration Example 3 of the inductance-changing mechanism according to the seventh embodiment of the disclosure.
Figure 19B:
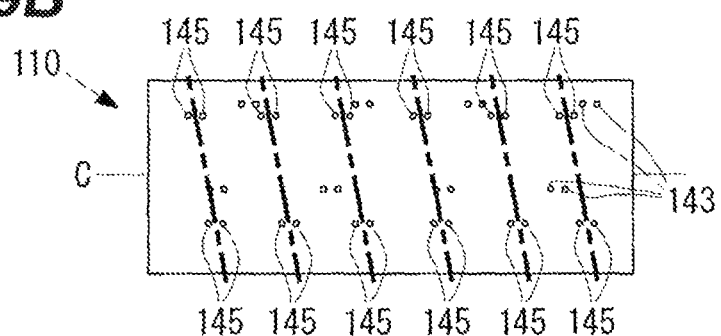

Holes 143 and 145 having a plurality of types of array patterns are formed as the above-described plurality of types of fixing portions on an outer circumference surface of the coil support body 105. Each of the plurality of types of array patterns is an array pattern for fixing the conductive wire 107 in a corresponding one of a plurality of types of arrangement patterns. FIG. 19A illustrates an arrangement pattern of the conductive wire 107 corresponding to the holes 143 formed in one type of array pattern. FIG. 19B illustrates an arrangement pattern of the conductive wire 107 corresponding to the holes 145 formed in another type of array pattern. In FIGS. 19A and 19B, a thick dot-and-dash line virtually illustrates the conductive wire 107 when the conductive wire 107 is disposed in each arrangement pattern.

The respective holes 143 and 145 of the respective types of array patterns are fixing portions for fixing the conductive wire 107. Fixing members 146 for fixing the conductive wire 107 are inserted into and attached to the respective holes 143 and 145 of the respective types of array patterns. An arrangement pattern of the conductive wire 107 fixed by the fixing members 146 which are attached to the holes 143 and 145 is changed by changing array patterns of the holes 143 and 145 to which the fixing members 146 are attached among the plurality of types of array patterns. In this way, a shape of a coil 103 is changed. That is, a shape of the coil 103 is changed by switching between one state in which the conductive wire 107 is fixed by fixing members 146 attached to the respective holes 143 having any one of the plurality of types of array patterns, and another state in which the conductive wire 107 is fixed by fixing members 146 attached to the respective holes 145 having another type of array pattern.

Figure 19C:
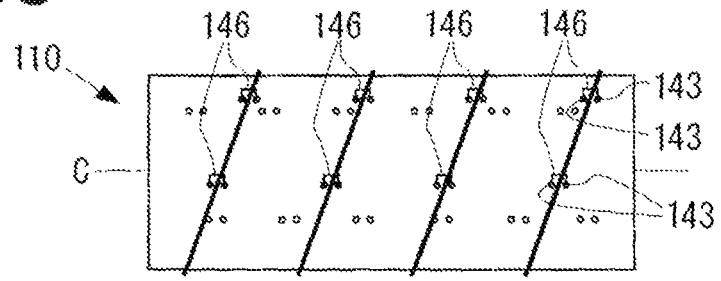

In FIG. 19C, the conductive wire 107 disposed in an arrangement pattern corresponding to one type of array pattern is fixed by inserting the fixing members 146 into the holes 143 formed in the array pattern. In this example, the fixing members 146 are U-shaped members, and the conductive wire 107 is put between the fixing members 146 and the outer circumference surface of the coil support body 105 by inserting two distal ends of each of the U-shaped members into two holes 143. In this way, the conductive wire 107 is fixed and supported.

Figure 19D:
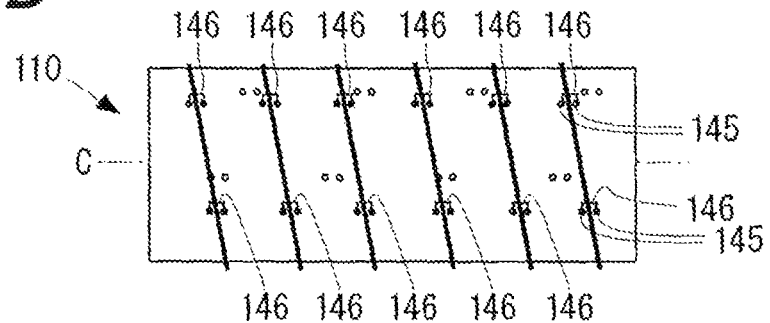

In FIG. 19D, the conductive wire 107 disposed in an arrangement pattern corresponding to another type of array pattern is fixed by inserting the fixing members 146 into the holes 145 formed in the array pattern. In this example, the fixing members 146 are U-shaped members, and the conductive wire 107 is put between the fixing members 146 and the outer circumference surface of the coil support body 105 by inserting two distal ends of each of the U-shaped members into two holes 145. In this way, the conductive wire 107 is fixed and supported.

A conductive wire for connection 113, the conductive wire 107, and a conductive wire for connection 113 continuously extend in order from a place P1 to a place P2. In addition, the conductive wire for connection 113 connected to the place P1, the conductive wire 107, and the conductive wire for connection 113 connected to the place P2 form one wire. In the one wire, a wire portion (the conductive wire 107) disposed in an arrangement pattern corresponding to any one of the plurality of types of array patterns forms the coil 103. Further, a length of the wire is set such that an arrangement pattern of the conductive wire 107 may be changed among the plurality of types of arrangement patterns.

(Configuration Example 4)

FIG. 20 illustrates a coil support body 105 according to Configuration Example 4. In Configuration Example 4 of FIG. 20, a fixing portion used to fix a conductive wire 107 may be changed among a plurality of types of fixing portions according to a configuration below.

Figure 20A:
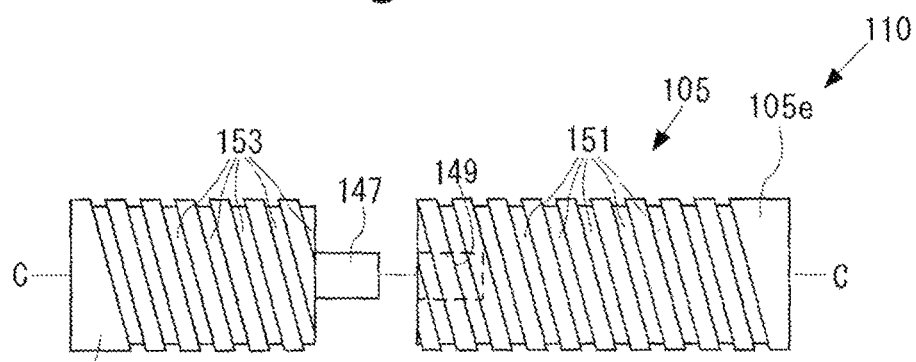
FIGS. 20A to 20C illustrate Configuration Example 4 of the inductance-changing mechanism according to the seventh embodiment of the disclosure.

The coil support body 105 includes a main coil support portion 105$e$ and a sub-coil support portion 105$f$ coaxially attachable and detachable to and from the main coil support portion 105$e$ in a direction of a winding axis C. FIG. 20A illustrates the main coil support portion 105$e$ and the sub-coil support portion 105$f$ separated from each other. When the sub-coil support portion 105$f$ is coaxially attached to the main coil support portion 105$e$ (see FIG. 20C), the main coil support portion 105$e$ and the sub-coil support portion 105$f$ have one cylindrical shape or prismatic shape as a whole.

For example, the sub-coil support portion 105$f$ is coupled to the main coil support portion 105$e$ by being screwed with the main coil support portion 105$e$, and the sub-coil support portion 105$f$ is detached from the main coil support portion 105$e$ by being unscrewed. In FIG. 20A, the sub-coil support portion 105$f$ includes a male screw portion 147, and the main coil support portion 105$e$ includes a female screw portion 149 with which the male screw portion 147 is screwed. However, the sub-coil support portion 105$f$ may be attachable and detachable to and from the main coil support portion 105$e$ through another means.

First and second grooves 151 and 153, in which the conductive wire 107 is disposed, are formed as the above-described plurality of types of fixing portions on an outer circumference surface of the main coil support portion 105$e$ and an outer circumference surface of the sub-coil support portion 105$f$, respectively. The first groove 151 continuously extends in a spiral in a direction of turning around the outer circumference surface of the main coil support portion 105$e$, and the second groove 153 continuously extends in a spiral in a direction of turning around the outer circumference surface of the sub-coil support portion 105f. Each of the first and second grooves 151 and 153 is the above-described fixing portion for fixing the conductive wire 107 disposed in the groove.

Figure 20B:
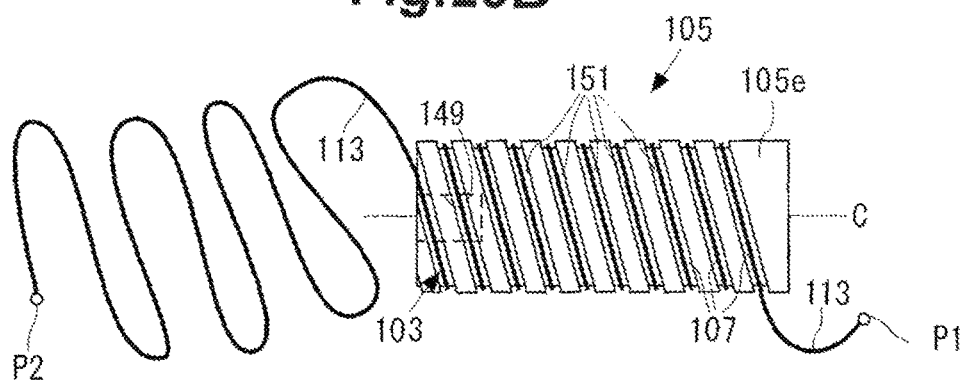
Figure 20C:
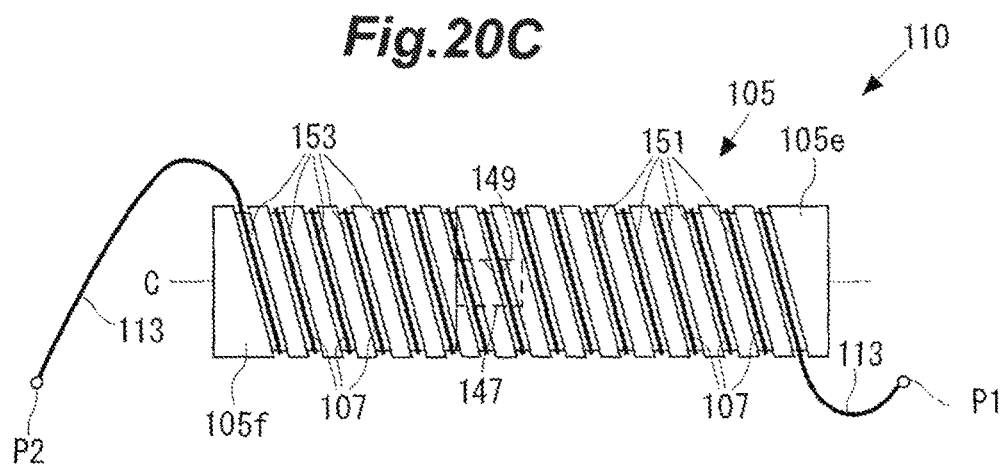

A groove in which the conductive wire 107 is disposed is switchable between the first groove 151 of only the main coil support portion 105e corresponding to one of the main coil support portion 105e and the sub-coil support portion 105f, and the first groove 151 of the main coil support portion 105e and the second groove 153 of the sub-coil support portion 105f attached to the main coil support portion 105e. That is, it is possible to switch between one state in which the conductive wire 107 is disposed in the first groove 151 of only the main coil support portion 105e corresponding to one of the main coil support portion 105e and the sub-coil support portion 105f, and another state in which the conductive wire 107 is disposed in the first groove 151 of the main coil support portion 105e and the second groove 153 of the sub-coil support portion 105f attached to the main coil support portion 105e. In this way, the fixing portion used to fix the conductive wire 107 may be changed among the plurality of types of fixing portions 151 and 153. FIG. 20B illustrates a case in which the conductive wire 107 is disposed only in the first groove 151 corresponding to one of the first and second grooves 151 and 153, and FIG. 20C illustrates a case in which the conductive wire 107 is disposed in the first groove 151 of the main coil support portion 105e and the second groove 153 of the sub-coil support portion 105f attached to the main coil support portion 105e.

Preferably, in a state in which the sub-coil support portion 105f is coaxially attached to the main coil support portion 105e, the first groove 151 and the second groove 153 form one continuous spiral groove.

A conductive wire for connection 113, the conductive wire 107, and a conductive wire for connection 113 continuously extend in order from a place P1 to a place P2. In addition, the conductive wire for connection 113 connected to the place P1, the conductive wire 107, and the conductive wire for connection 113 connected to the place P2 form one wire. In the one wire, a wire portion (the conductive wire 107) disposed in the first groove 151 or in the first groove 151 and the second groove 153 forms the coil 103. Further, a length of the wire is set such that a groove in which the conductive wire 107 is disposed is switchable between the first groove 151 and the first groove 151 and the second groove 153.

In Configuration Example 4, the coil 103 is supported by the coil support body 105 when the coil 103 is disposed in the first groove 151 or the second groove 153.

According to the above-described inductance-changing mechanism, a coil support body includes first and second fixing portions, to which both end portions of a coil are fixed, or a plurality of types of fixing portions for fixing a conductive wire. Here, mutual relative positions of the first and second fixing portions are changeable. In addition, a shape of the coil is changed due to relative positions of the first and second fixing portions being changeable, or a state being switchable between one state in which the conductive wire is fixed by any one of a plurality of types of fixing portions and another state in which the conductive wire is fixed by another fixing portion. That is, at least one of a cross-sectional area of the coil, the number of turns of the coil, and a length of the coil in an axial direction is changed. An inductance value of the coil depends on the cross-sectional area of the coil, the number of turns of the coil, and the length of the coil in the axial direction. Therefore, the inductance value of the coil may be changed by changing the shape of the coil (that is, at least one of the cross-sectional area of the coil, the number of turns of the coil, and the length of the coil in the axial direction). In this case, since the inductance value of the coil is changed by changing the shape of the coil, a magnetic body disposed inside the coil is not used. Therefore, the inductance value of the coil may be changed when the magnetic body is disposed inside the coil included in an electric circuit, or when the magnetic body is not disposed inside the coil of the electric circuit. In this way, a desired inductance may be achieved.

The disclosure is not restricted to the above-described embodiments, and may be variously changed within the scope not departing from the subject matter of the disclosure.

For example, even though a mode in which the bellows portion 106 is disposed outside the connecting portion 121 has been described in Configuration Example 2 of the sixth embodiment, the disclosure is not restricted to the mode. For example, the bellows portion 106 may be omitted, and a cover member having the same configuration as that of the cover member 105d of Configuration Example 1 of the seventh embodiment may be attached to the connecting portion 121. The same groove as the groove 137 of Configuration Example 1 of the seventh embodiment may be formed on the cover member, or holes may be formed in the cover member in a plurality of types of array patterns similarly to Configuration Example 3 of the seventh embodiment. The conductive wire 107 is fixed by disposing the conductive wire 107 in the groove, or the conductive wire 107 is fixed similarly to Configuration Example 3 of the seventh embodiment by inserting the fixing members 146 into respective holes formed in any one of the plurality of types of array patterns.

In addition, a whole or a portion of the coil support body 105 of the sixth embodiment and the seventh embodiment may be formed using a magnetic member (ferrite, a silicon steel plate, an amorphous magnetic alloy, etc.).

INDUSTRIAL APPLICABILITY

According to some embodiments of the disclosure, a desired inductance may be achieved.

REFERENCE SIGNS LIST

1: wireless power transfer system
3: power transmitter
4: power receiver
14: power transmission coil device
15: power transmission coil portion
15A, 15B: coil portion
16: power transmission-side shield plate (non-magnetic member)
16A: power transmission-side shield plate (non-magnetic member)
25: power reception coil device
26: power reception coil portion
27: power reception-side shield plate (non-magnetic member)
40: eddy current interrupter
40a: slits
50A, 50B, 50C, 50D, 50E, 50F: slit
51: conductive wire
52: conductive wire
53: sheet-shaped member 56a: first shield plate
56b: second shield plate
56B: power transmission-side shield plate
57: moving mechanism
58: bimetal (moving mechanism)
59: cooling device
65, 66, 67: power transmission-side shield plate
65a, 66a, 67a: first shield plate
65b, 66b, 67b: second shield plate
103: coil (coil spring)
104: end surface
105: coil support body
105a: first coil support portion
105b: second coil support portion
105c: central member
105d: cover member
105e: main coil support portion
105f: sub-coil support portion
106: bellows portion
107: conductive wire
108: middle coil support portion
109: first fixing portion
110: inductance-changing mechanism
111: second fixing portion
112: slide surface
113: conductive wire for connection
114: slide surface
115: hole
116: end surface
117: hole (maintenance mechanism)
118: end surface
119: pin (maintenance mechanism)
121: connecting portion
122: hollow hole
121a, 121b: diameter-enlarged portion
123: fixing means
124: hollow hole
125: holes
126: bracket
127: engaged member
128: screw
129: engaged member
131: first cover portion
132: hinge
133: second cover portion
134: screw
135: first groove (fixing portion)
137: second groove (fixing portion)
139, 141: groove (fixing portion)
143, 145: holes
146: fixing members
147: male screw portion
149: female screw portion
151: first groove (fixing portion)
153: second groove (fixing portion)

The invention claimed is:

1. A coil device facing another coil device to transmit or receive power wirelessly, the coil device comprising:
a first coil portion facing a second coil portion of the other coil device and including a conductive wire;
a plurality of non-magnetic members which are electrically conductive and disposed such that the first coil portion is positioned between the plurality of non-magnetic members and the second coil portion,
wherein the plurality of non-magnetic members includes a first non-magnetic member and a second non-magnetic member which are disposed such that the first non-magnetic member is positioned between the first coil portion and the second non-magnetic member, and
wherein at least one of the first non-magnetic member and the second non-magnetic member includes an eddy current interrupter for changing a state of an eddy current formed in the at least one of the first non-magnetic member and the second non-magnetic member by interrupting a portion of the eddy current, the eddy current interrupter including a hole portion penetrating the at least one of the first non-magnetic member and the second non-magnetic member or a depressed portion in the at least one of the first non-magnetic member and the second non-magnetic member, and
a conductive sheet-shaped member provided between the first non-magnetic member and the second non-magnetic member, and including a first surface in contact with the first non-magnetic member and a second surface in contact with the second non-magnetic member.

2. The coil device according to claim 1, further comprising:
a moving mechanism configured to move the first non-magnetic member along the first surface of the conductive sheet-shaped member or the second non-magnetic member along the second surface of the conductive sheet-shaped member.

3. The coil device according to claim 2, further comprising:
a movement control mechanism configured to adjust a distance for which the at least one of the first non-magnetic member and the second non-magnetic member is moved by the moving mechanism by controlling the moving mechanism.

4. The coil device according to claim 1, wherein each of the first non-magnetic member and the second non-magnetic member includes a hole portion that is the eddy current interrupter, and a first hole portion of the first non-magnetic member and a second hole portion of the second non-magnetic member are formed in similar patterns.

5. The coil device according to claim 1, wherein each of the first non-magnetic member and the second non-magnetic member includes a hole portion that is the eddy current interrupter, and a first hole portion of the first non-magnetic member and a second hole portion of the second non-magnetic member are formed in different patterns.

6. The coil device according to claim 1,
wherein the first non-magnetic member includes a hole portion that is the eddy current interrupter, and
the second non-magnetic member includes a first flat surface being in contact with the conductive sheet and a second flat surface opposite to the first flat surface.

7. The coil device according to claim 1, wherein the first coil is a solenoid coil and has a plate-shaped bobbin including a pair of surfaces opposite to each other,
wherein the conductive wire is wound around the plate-shaped bobbin and extend along the pair of surfaces,
wherein the eddy current interrupter is a long hole portion or a groove portion extending along the first surface and the second surface, and
wherein the long hole portion or the groove portion extends in a direction intersecting with an extending direction of the conductive wire in the first coil portion.

8. The coil device according to claim 7, wherein the long hole portion or the groove portion extends to a position outward from the first coil portion.

* * * * *